United States Patent
Abotabl et al.

(10) Patent No.: US 11,910,434 B2
(45) Date of Patent: Feb. 20, 2024

(54) SIDELINK CHANNEL ACCESS TIMELINE TECHNIQUES FOR WIRELESS COMMUNICATIONS SYSTEMS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/230,974

(22) Filed: Apr. 14, 2021

(65) Prior Publication Data

US 2022/0338254 A1     Oct. 20, 2022

(51) Int. Cl.
*H04W 74/08*     (2009.01)
*H04L 5/14*     (2006.01)
(Continued)

(52) U.S. Cl.
CPC ........... *H04W 74/0808* (2013.01); *H04L 5/14* (2013.01); *H04W 8/24* (2013.01); *H04W 72/02* (2013.01);
(Continued)

(58) Field of Classification Search
CPC ..................................................... H04W 72/02
See application file for complete search history.

(56) References Cited

U.S. PATENT DOCUMENTS

| 2018/0220463 | A1* | 8/2018 | Fodor ................. H04W 88/023 |
| 2019/0261415 | A1 | 8/2019 | Hosseini et al. |
| 2020/0322972 | A1 | 10/2020 | Hosseini et al. |

FOREIGN PATENT DOCUMENTS

| WO | WO-2021042317 A1 | 3/2021 |
| WO | WO-2021046835 A1 * | 3/2021 |

OTHER PUBLICATIONS

Partial International Search Report and Written Opinion—PCT/US2022/071256—ISA/EPO—dated Jun. 21, 2022 (2102821WO).

(Continued)

*Primary Examiner* — Jianye Wu
(74) *Attorney, Agent, or Firm* — Holland & Hart LLP/QUALCOMM Incorporated

(57) ABSTRACT

Methods, systems, and devices for wireless communications are described. In some examples, a user equipment (UE) may receive control signaling indicating a configuration for performing channel sensing. The configuration may include one or more parameters corresponding to a processing time associated with the channel sensing. The UE may adjust the processing time associated with the channel sensing based on the one or more parameters and a full duplex capability of the first UE. The UE may transmit, using a first set of resources, a sidelink message based on the adjusted processing time. In some examples, the UE may transmit a first data message associated with a first priority level and perform channel sensing for a second data message associated with a second priority level that is higher than the first priority level. The UE may drop the first data message, skip an interference cancellation, or a combination thereof.

30 Claims, 13 Drawing Sheets

(51) Int. Cl.
*H04W 8/24* (2009.01)
*H04W 72/02* (2009.01)
*H04W 74/00* (2009.01)
*H04W 80/02* (2009.01)
*H04W 92/18* (2009.01)

(52) U.S. Cl.
CPC ......... *H04W 74/008* (2013.01); *H04W 80/02* (2013.01); *H04W 92/18* (2013.01)

(56) References Cited

OTHER PUBLICATIONS

3GPP TS 38.214: "3rd Generation Partnership Project, Technical Specification Group Radio Access Network, NR, Physical Layer Procedures for Data (Release 16)", DRAFT38214-G40, V16.4.0, (Dec. 2020), 3GPP, Mobile Competence Centre, 650, Route Des Lucioles, F-06921 Sophia-Antipolis Cedex, France, Vol. RAN WG1, No. Jan. 8, 2021, 169 Pages, XP051999688.

"3rd Generation Partnership Project, Technical Specification Group Radio Access Network, Overall description of Radio Access Network (RAN) Aspects for Vehicle-to-Everything (V2X) Based on LTE and NR (Release 16)", 3GPP Standard, Technical Report, 3GPP TR 37.985, 3rd Generation Partnership Project (3GPP), Mobile Competence Centre, 650, Route Des Lucioles, F-06921 Sophia-Antipolis Cedex, France, No. V16.0.0, Jul. 14, 2020, pp. 1-35, XP051925050, Sections 5.1, 5.2, 6.2.1 and 6.3.

International Search Report and Written Opinion—PCT/US2022/071256—ISA/EPO—dated Sep. 16, 2022 (2102821WO).

Sharp: "PUCCH Considerations for URLLC", 3GPP TSG RAN WG1 Meeting #88bis, R1-1705476, 3rd Generation Partnership Project, Mobile Competence Centre, 650, Route Des Lucioles, F-06921 Sophia-Antipolis Cedex, France, Vol. RAN WG1, No. Spokane, USA, Apr. 3, 2017-Apr. 7, 2017, Apr. 2, 2017, XP051243605, 2 Pages, Section 3.

3GPP: "3rd Generation Partnership Project, Technical Specification Group Radio Access Network, NR, Physical Layer Procedures for Control (Release 16)", 3GPP Standard, Technical Specification, 3GPP TS 38.213, 3rd Generation Partnership Project, Mobile Competence Centre, 650, Route Des Lucioles, F-06921, Sophia-Antipolis, Cedex, France, Vol. RAN WG1, No. V16.0.0, Dec. 2019, Jan. 14, 2020, XP051860806, pp. 1-146.

\* cited by examiner

Sidelink Control Information 120

SIDELINK CHANNEL ACCESS TIMELINE TECHNIQUES FOR WIRELESS COMMUNICATIONS SYSTEMS

INTRODUCTION

The following relates to wireless communications, and more specifically to managing sidelink communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a first user equipment (UE) is described. The method may include receiving control signaling indicating a configuration for performing channel sensing, the configuration including one or more parameters corresponding to a processing time associated with the channel sensing, adjusting the processing time associated with the channel sensing based on the one or more parameters and a full duplex capability of the first UE, and transmitting, to a second UE using a first set of resources, a sidelink message based on the adjusted processing time.

An apparatus for wireless communications at a first UE is described. The apparatus may include a processor and memory coupled with the processor. The processor and memory may be configured to receive control signaling indicating a configuration for performing channel sensing, the configuration including one or more parameters corresponding to a processing time associated with the channel sensing, adjust the processing time associated with the channel sensing based on the one or more parameters and a full duplex capability of the first UE, and transmit, to a second UE using a first set of resources, a sidelink message based on the adjusted processing time.

Another apparatus for wireless communications at a first UE is described. The apparatus may include means for receiving control signaling indicating a configuration for performing channel sensing, the configuration including one or more parameters corresponding to a processing time associated with the channel sensing, means for adjusting the processing time associated with the channel sensing based on the one or more parameters and a full duplex capability of the first UE, and means for transmitting, to a second UE using a first set of resources, a sidelink message based on the adjusted processing time.

A non-transitory computer-readable medium storing code for wireless communications at a first UE is described. The code may include instructions executable by a processor to receive control signaling indicating a configuration for performing channel sensing, the configuration including one or more parameters corresponding to a processing time associated with the channel sensing, adjust the processing time associated with the channel sensing based on the one or more parameters and a full duplex capability of the first UE, and transmit, to a second UE using a first set of resources, a sidelink message based on the adjusted processing time.

In some examples of the method, apparatuses, and non-transitory computer-readable medium described herein, adjusting the processing time may include operations, features, means, or instructions for increasing a first duration of the processing time associated with a half duplex capability to a second duration for the processing time associated with the full duplex capability of the first UE, where the one or more parameters indicate the second duration.

Some examples of the method, apparatuses, and non-transitory computer-readable medium described herein may further include operations, features, means, or instructions for adjusting a beginning of a resource selection window based on increasing the first duration to the second duration.

In some examples of the method, apparatuses, and non-transitory computer-readable medium described herein, adjusting the processing time may include operations, features, means, or instructions for reducing a duration of a sensing window associated with the channel sensing based on the full duplex capability of the first UE and increasing a first duration for the processing time associated with a half duplex capability to a second duration for the processing time associated with the full duplex capability of the first UE, where the one or more parameters indicate the second duration.

In some examples of the method, apparatuses, and non-transitory computer-readable medium described herein, the received control signaling includes a radio resource control message, a downlink control information message, a medium access control control element message, or any combination thereof.

In some examples of the method, apparatuses, and non-transitory computer-readable medium described herein, the one or more parameters include a first parameter indicating a first duration for the processing time and a second parameter indicating a second duration for the processing time, the first duration corresponding to a first interference cancellation capability of the first UE and the second duration corresponding to a second interference cancellation capability of the first UE.

Some examples of the method, apparatuses, and non-transitory computer-readable medium described herein may further include operations, features, means, or instructions for adjusting the processing time to the first duration based on the first UE operating in a half duplex mode, the second duration based on the first UE operating in a full duplex mode, or a combination thereof.

Some examples of the method, apparatuses, and non-transitory computer-readable medium described herein may further include operations, features, means, or instructions for monitoring a sensing window using the full duplex capability of the first UE for a first duration and performing an interference cancellation for the channel sensing during the adjusted processing time based on monitoring the sensing window using the full duplex capability of the first UE.

Some examples of the method, apparatuses, and non-transitory computer-readable medium described herein may further include operations, features, means, or instructions for performing the channel sensing using the adjusted processing time.

Some examples of the method, apparatuses, and non-transitory computer-readable medium described herein may further include operations, features, means, or instructions for selecting the first set of resources based on a result of the channel sensing, where transmitting the sidelink message may be based on the selected first set of resources.

A method for wireless communications at a first UE capable of operating in a full duplex mode is described. The method may include transmitting, using a first set of resources, a first data message associated with a first priority level, performing channel sensing for a second data message to be transmitted to a second UE, the second data message associated with a second priority level that is higher than the first priority level, and dropping the first data message during the channel sensing based on the second data message being associated with the second priority level.

An apparatus for wireless communications at a first UE capable of operating in a full duplex mode is described. The apparatus may include a processor and memory coupled with the processor. The processor and memory may be configured to transmit, using a first set of resources, a first data message associated with a first priority level, perform channel sensing for a second data message to be transmitted to a second UE, the second data message associated with a second priority level that is higher than the first priority level, and drop the first data message during the channel sensing based on the second data message being associated with the second priority level.

Another apparatus for wireless communications at a first UE capable of operating in a full duplex mode is described. The apparatus may include means for transmitting, using a first set of resources, a first data message associated with a first priority level, means for performing channel sensing for a second data message to be transmitted to a second UE, the second data message associated with a second priority level that is higher than the first priority level, and means for dropping the first data message during the channel sensing based on the second data message being associated with the second priority level.

A non-transitory computer-readable medium storing code for wireless communications at a first UE capable of operating in a full duplex mode is described. The code may include instructions executable by a processor to transmit, using a first set of resources, a first data message associated with a first priority level, perform channel sensing for a second data message to be transmitted to a second UE, the second data message associated with a second priority level that is higher than the first priority level, and drop the first data message during the channel sensing based on the second data message being associated with the second priority level.

Some examples of the method, apparatuses, and non-transitory computer-readable medium described herein may further include operations, features, means, or instructions for selecting a second set of resources based on performing the channel sensing and dropping the first data message and transmitting the second data message using the selected second set of resources.

Some examples of the method, apparatuses, and non-transitory computer-readable medium described herein may further include operations, features, means, or instructions for transmitting the second data message using the first set of resources based on dropping the first data message.

In some examples of the method, apparatuses, and non-transitory computer-readable medium described herein, the second data message includes a low latency message.

A method for wireless communications at a first UE capable of operating in a full duplex mode is described. The method may include transmitting, using a first set of resources, a first data message associated with a first priority level, performing channel sensing for a second data message to be transmitted to a second UE, the second data message associated with a second priority level that is higher than the first priority level, and skipping an interference cancellation for the channel sensing based on the second data message being associated with the second priority level.

An apparatus for wireless communications at a first UE capable of operating in a full duplex mode is described. The apparatus may include a processor and memory coupled with the processor. The processor and memory may be configured to transmit, using a first set of resources, a first data message associated with a first priority level, perform channel sensing for a second data message to be transmitted to a second UE, the second data message associated with a second priority level that is higher than the first priority level, and skip an interference cancellation for the channel sensing based on the second data message being associated with the second priority level.

Another apparatus for wireless communications at a first UE capable of operating in a full duplex mode is described. The apparatus may include means for transmitting, using a first set of resources, a first data message associated with a first priority level, means for performing channel sensing for a second data message to be transmitted to a second UE, the second data message associated with a second priority level that is higher than the first priority level, and means for skipping an interference cancellation for the channel sensing based on the second data message being associated with the second priority level.

A non-transitory computer-readable medium storing code for wireless communications at a first UE capable of operating in a full duplex mode is described. The code may include instructions executable by a processor to transmit, using a first set of resources, a first data message associated with a first priority level, perform channel sensing for a second data message to be transmitted to a second UE, the second data message associated with a second priority level that is higher than the first priority level, and skip an interference cancellation for the channel sensing based on the second data message being associated with the second priority level.

Some examples of the method, apparatuses, and non-transitory computer-readable medium described herein may further include operations, features, means, or instructions for selecting a second set of resources based on performing the channel sensing and skipping the interference cancellation and transmitting the second data message using the selected second set of resources.

Some examples of the method, apparatuses, and non-transitory computer-readable medium described herein may further include operations, features, means, or instructions for determining a measurement of a sensing window associated with the channel sensing and modifying the measurement using an adjustment parameter based on skipping the interference cancellation.

Some examples of the method, apparatuses, and non-transitory computer-readable medium described herein may further include operations, features, means, or instructions for receiving control signaling indicating the adjustment parameter.

Some examples of the method, apparatuses, and non-transitory computer-readable medium described herein may further include operations, features, means, or instructions for selecting a second set of resources based on the channel sensing and the modified measurement and transmitting the second data message using the selected second set of resources.

In some examples of the method, apparatuses, and non-transitory computer-readable medium described herein, the second data message includes a low latency message.

DETAILED DESCRIPTION

Figure 1:
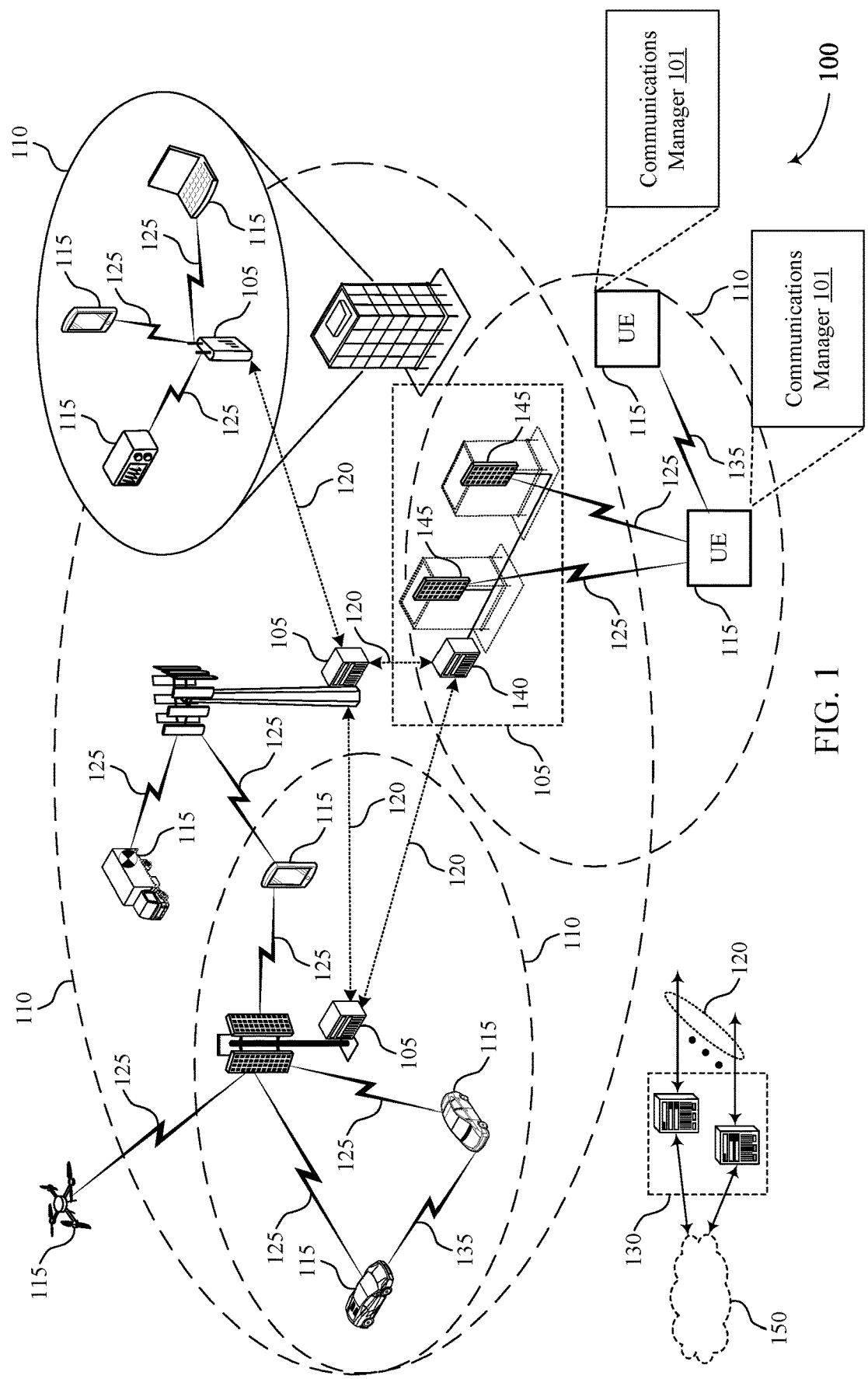
FIG. 1 illustrates an example of a wireless communications system that supports sidelink channel access timeline techniques for wireless communications systems in accordance with one or more aspects of the present disclosure.

Some wireless communications systems may support a sidelink resource allocation mode (e.g., sidelink resource allocation mode 2) in which one or more user equipments (UEs) may autonomously perform channel sensing to select or reserve resources for a sidelink transmission. To perform channel sensing, a UE may measure reference signaling received via one or more resources within a sensing window according to a signal metric level (e.g., a reference signal received power (RSRP) level).

The reference signaling may correspond to sidelink control information (SCI) transmitted by another UE in the sensing window, and the SCI may reserve one or more resources in a corresponding resource selection window. The UE may exclude or include the one or more resources from a set of available resource candidates based on the measured signal metric level of the corresponding reference signaling. In some cases, a UE that supports full-duplex communications may transmit and receive transmissions that may overlap in time (e.g., the UE may concurrently transmit and receive communications in the full-duplex mode). In the course of communications (e.g., full-duplex communications), the UE may also receive interference from various sources (e.g., another UE or a base station). Additionally or alternatively, the UE may experience self-interference (e.g., the UE may receive first communications while transmitting second communications and the second communications may result in noise or other interference associated with receiving the first communications). Such interference may affect communications in the system.

Accordingly, wireless devices (e.g., UEs) as described herein may implement techniques for sidelink channel access timelines, low latency messaging, or a combination thereof. For example, a UE may be configured with one or more parameters that correspond to a processing time related to channel sensing (e.g., the UE may sense a channel prior to selecting sidelink resources). The processing time may refer to the time between the end of a sensing window and a resource selection trigger. For example, the processing time may be a time duration configured at the UE to determine measurements based on monitoring the sensing window, compare the measurements to thresholds, apply interference cancellation techniques, and the like, prior to selection of resources for a transmission. The one or more parameters may indicate a duration of a processing time (e.g., a timeline) as part of the channel sensing.

As an example, the UE may adjust the processing time based on the one or more parameters, a capability of the UE (e.g., a full duplex capability of the UE), or a combination thereof. For instance, the UE may receive control signaling (e.g., radio resource control (RRC) signaling, medium access control (MAC) control element (CE) signaling, downlink control information (DCI), SCI, or any combination thereof. The control signaling may configure the UE with one or more values for one or more capabilities of the UE (e.g., a full duplex UE may be capable of dull duplex operations and be configured with a longer time duration for the processing time, for example, in order to apply interference cancellation). In some examples, the difference between a first value of a first capability (e.g., a processing time for a half-duplex UE) and a second value of a second capability (e.g., a processing time for a full-duplex UE) may enable the UE to perform interference management techniques.

Additionally, or alternatively, a UE may implement techniques for low latency messages. For example, the UE may be transmitting a first message (e.g., a low-priority message). Additionally, or alternatively, the UE may be sensing a window to select resources for a second message (e.g., a high priority message). For example, the UE may be a full duplex UE and may be transmitting the first message concurrently with sensing the window for the second message. In such examples, the UE may be unable to transmit the high priority message with a desired latency, for example, due to the additional processing time for applying interference cancellation between the sensing and the low priority message. In some examples, the UE may drop the current (e.g., low priority) transmission in order to skip interference cancellation, or the UE may replace the current transmission with the high priority transmission. Additionally or alternatively, the UE may maintain the current transmission and skip interference cancellation (e.g., the UE may account for interference using other techniques, such as implementing a modified offset value for RSRP to account for self-interference).

In some examples, by implementing the processing time based on the one or more parameters, a UE may accommodate an interference cancellation procedure for a full duplex capability of the UE, which may result in improved communications reliability, reduced power consumption, or both. Additionally or alternatively, by implementing techniques to drop a low priority message or skip interference cancellation, the UE may realize reduced latency for high priority messages.

Aspects of the disclosure are initially described in the context of wireless communications systems. Aspects of the disclosure are then illustrated by and described with reference to a channel sensing scheme and process flows. Aspects of the disclosure are further illustrated by and described with reference to apparatus diagrams, system diagrams, and flowcharts that relate to sidelink channel access timeline techniques for wireless communications systems.

FIG. 1 illustrates an example of a wireless communications system 100 that supports sidelink channel access timeline techniques for wireless communications systems in accordance with one or more aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some examples, the wireless devices may implement one or more techniques for sidelink channel access timelines, low latency messaging, or a combination thereof as described herein. For example, a UE 115 may include a communications manager 101 configured to perform the various operations and techniques described herein. For example, a UE 115 may receive a configuration from a base station 105 (or another device such as another UE 115) for performing the channel sensing procedure. The channel sensing procedure may be part of or include a sidelink resource selection procedure for identifying sidelink resource candidates in a resource selection window. The configuration may indicate one or more parameters corresponding to a processing time associated with the channel sensing. For example, the UE 115 may transmit control signaling (e.g., to the base station 105, another UE 115, among other examples of devices) indicating a capability of the UE 115 (e.g., an indication that the UE 115 may be capable of full duplex communications, half-duplex communications, or a combination thereof). The UE 115 may receive the configuration in response to the indicated capability. For example, the UE 115 may receive control signaling indicating a first parameter for the capability (e.g., the configuration may indicate a first duration for the processing time for full duplex capable UEs 115 in addition or alternative to a second duration for the processing time for half-duplex UEs 115).

The UE 115 may adjust the processing time associated with the channel sensing based on the one or more parameters and a full-duplex capability of the UE 115. For example, if the UE 115 transmits while performing channel sensing (e.g., a full-duplex mode), the UE 115 may adjust the processing time associated with channel sensing. If the UE 115 does not transmit while performing channel sensing (e.g., a half-duplex mode), the UE 115 may not adjust the processing time associated with channel sensing, or may adjust the processing time to a different value than a value that may be used if the UE 115 is transmitting while performing channel sensing (e.g., the UE may use a relatively smaller duration for the processing time and refrain from applying interference cancellation techniques based on the half-duplex mode). The reference signaling may correspond to a set of sidelink resource candidates in a resource selection window, and the UE 115 may determine an available set of sidelink resource candidates from the set of sidelink resource candidates based on the measuring. The UE 115 may select one or more resources of the available set of sidelink resource candidates for performing a sidelink transmission. In some examples, the UE 115 may implement one or more techniques for low latency messages as described herein. For example, while operating in a full duplex mode, the UE 115 may drop a first transmission (e.g., a low priority transmission) and refrain from performing interference cancellation for a second transmission (e.g., a high priority transmission), the UE 115 may replace the first transmission with the second transmission, the UE 115 may refrain from applying interference cancellation (e.g., the UE 115 may implement a modified offset parameter for one or more measurements to account for interference), or any combination thereof.

Figure 2:
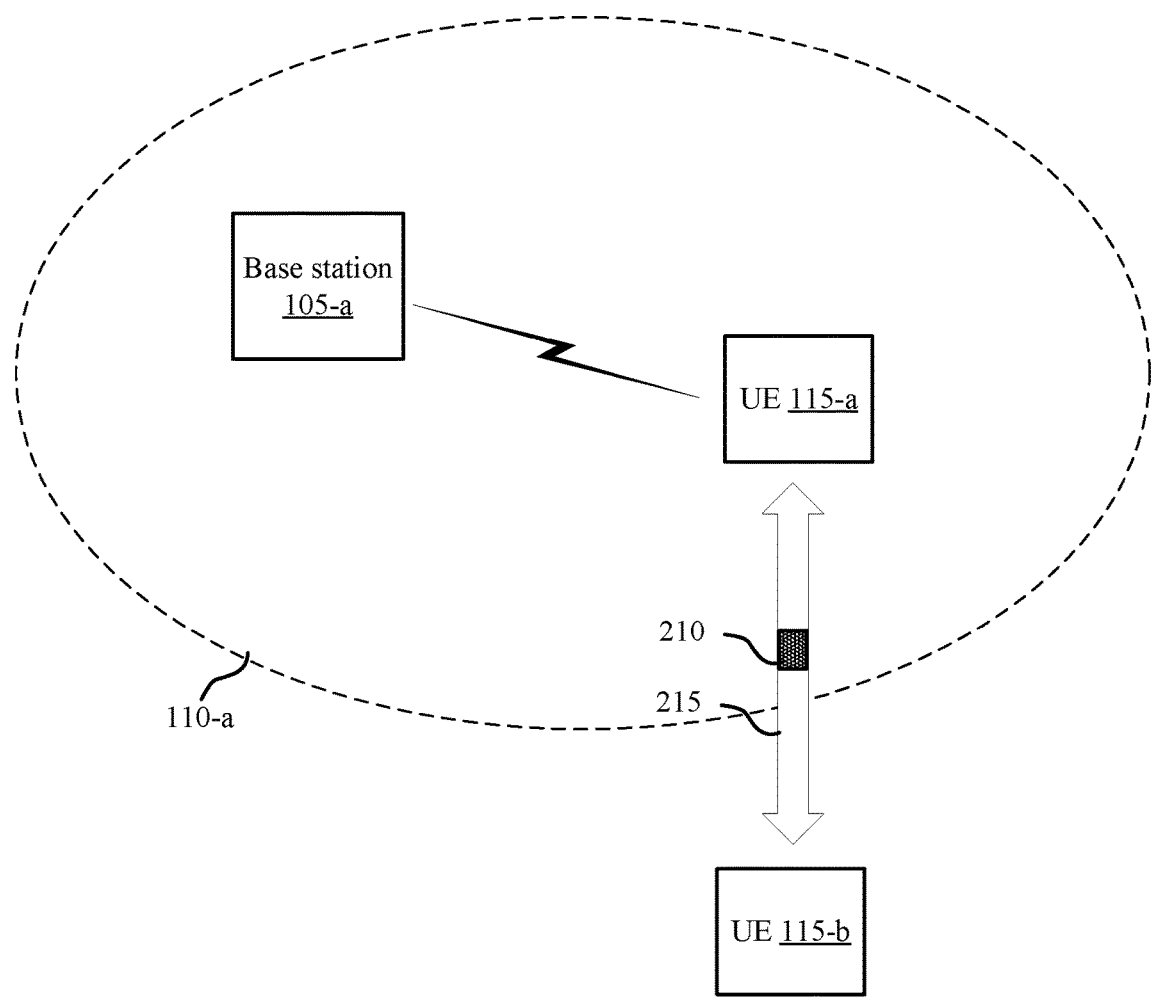
FIG. 2 illustrates an example of a wireless communications system that supports sidelink channel access timeline techniques for wireless communications systems in accordance with one or more aspects of the present disclosure.
Figure 2:

FIG. 2 illustrates an example of a wireless communications system 200 that supports sidelink channel access timeline techniques for wireless communications systems in accordance with one or more aspects of the present disclosure. The wireless communications system 200 may include a base station 105-a, a UE 115-a, and a UE 115-b, which may be examples of a base station 105 and UEs 115 as described with reference to FIG. 1. In some examples, the base station 105-a and the UE 115-a may be located in a geographic coverage area 110-a. The base station may communicate with the UE 115-a via downlink communication links and uplink communication links. In some examples, both the UE 115-a and the UE 115-b may be located outside of the geographic coverage area 110-a, and the UE 115-a may not communicate with the base station 105-a. Additionally, the UE 115-a may communicate with the UE 115-b via a sidelink communication link 215 (e.g., a PC5 link). In some examples, one or both of the UE 115-a and the UE 115-b may perform a resource selection procedure which may include sensing in a sensing window and reserving sidelink resources in a resource selection window based on the sensing.

In some examples, UE 115-a may receive control signaling (e.g., sidelink control information 210 received from UE 115-b, downlink control information received from the base station 105-a, or any combination thereof). In some examples, the control signaling may be an example of RRC signaling, a MAC-CE message, DCI, SCI, or any combination thereof. As an illustrative example, the UE 115-a may transmit a capability message to the UE 115-b, the base station 105-b, or both. The capability message may indicate a capability of the UE 115-a. For example, the capability message may indicate that the UE 115-a may be capable of full-duplex communications. In some examples, the UE 115-a may receive the control signaling in response to the capability message. The sidelink control information 210 (or other control information) may include or indicate a configuration for channel sensing. Such a configuration may include one or more parameters corresponding to a processing time associated with channel sensing. For example, the one or more parameters may indicate a length of the processing time which the UE 115-a is to use for processing in a full-duplex mode, which may be longer than a length of the processing time which the UE 115-a would use for processing in a half-duplex mode. In some examples, the control signaling may indicate multiple parameters (e.g., a first processing duration parameter for a first capability, a second processing duration parameter for a second capability, and the like), or the control signaling may indicate a single parameter in response to the capability message, among other examples of types and quantities of parameters.

The UE 115-a may implement a processing time associated with the channel sensing based on the one or more parameters (e.g., the UE 115-a may adjust a processing time of the channel sensing procedure in accordance with a parameter). For example, if the one or more parameters indicate a duration of time which the UE 115-a is to use for processing in a full-duplex mode, then the UE 115-a may adjust the processing time for channel sensing to correspond to the duration of time indicated in the one or more parameters.

The UE 115-a may transmit a sidelink message based on the processing time. For example, if the UE 115-a adjusts the processing time to accommodate additional processing (e.g., additional processing related to interference cancellation techniques or other interference management techniques), then the channel sensing and message transmission timeline may be adjusted such that the UE 115-a may be enabled to perform the additional processing.

In some examples, the UE 115-a may transmit a first data message that is associated with a priority level (e.g., a low priority level) and may further perform channel sensing for sidelink communications as described herein. The channel sensing may be associated with a second data message, and the second data message may also have a priority level (e.g., a high priority level). For example, if the first data message is associated with a low priority level and the second data message is associated with a high priority level, the UE 115-a may drop the first data message while performing the channel sensing (e.g., the UE 115-a may drop the first data message based on the second data message being a higher priority level than the first data message). In this way, the timeline for the second data message timeline may not be affected by additional processing that may be performed in relation to the second data message as a result of the first data message (e.g., additional processing to cancel interference from the first data message that may interfere with the channel sensing associated with the second data message). Stated alternatively, by dropping the first data message, the UE 115-a may reduce self-interference and refrain from performing interference cancellation without reducing an accuracy of the channel sensing (e.g., the UE 115-a may transmit the high priority message relatively quickly due to saving time by refraining from performing the interference cancellation).

In some examples, the UE 115-a may replace the first data message with the second data message. For example, the UE 115-a may drop the current low priority transmission and begin transmitting the higher priority transmission using the resources of the low priority transmission (i.e., the UE 115-a may preempt the resources of the first data message for transmission of the second data message based on the higher priority, or lower latency threshold, of the second data message). In some examples, the UE 115-a may maintain the first data message and refrain from using additional processing time (e.g., for interference cancellation), which may enable the UE 115-a to transmit on earlier resources for the second data message and satisfy a latency threshold. In some such examples, to account for interference, the UE 115-a may implement other techniques than interference cancellation processing of the sensing window. For example, the UE 115-a may use a modified measurement threshold for performing the sensing window. The modified measurement threshold may account for interference when identifying resources for selection for the second data message. For example, the modified measurement threshold may be an example of a modified offset value for a RSRP threshold (e.g., if a measurement such as RSRP is below the modified offset value for the RSRP threshold, the UE 115-a may determine that the associated resources are available). In some examples, the RSRP threshold may be modified to be less than a configured RSRP threshold (e.g., a lower threshold may account for noise from transmitting the first message while monitoring the window to select resource for the second message in a full duplex mode). In some examples, the modified offset parameter (i.e., modified offset value), the modified threshold, or both may be indicated by control signaling or may be pre-configured at the UE 115-a.

In some other examples, the situation may be reversed, and the first data message may have a higher priority than the second data message. For example, if the first data message is associated with a high priority level, and the second data message is associated with a low priority level, additional processing that may be performed in relation to the second data message as a result of the first data message (e.g., additional processing to cancel interference from the first data message that may interfere with the channel sensing associated with the second data message) may not be performed.

Figure 3:
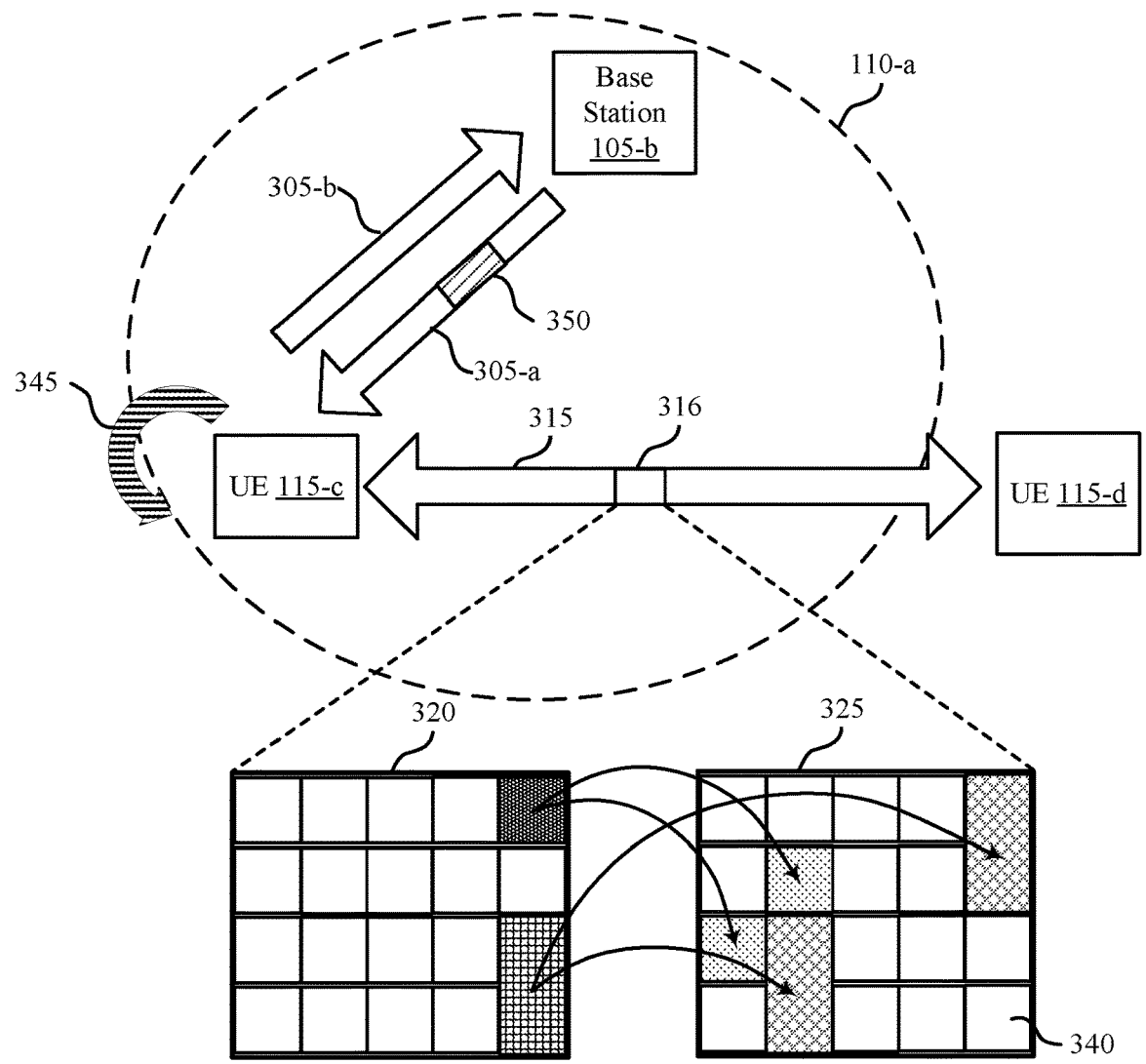
FIG. 3 illustrates an example of a wireless communications system that supports sidelink channel access timeline techniques for wireless communications systems in accordance with one or more aspects of the present disclosure.

FIG. 3 illustrates an example of a wireless communications system 300 that supports sidelink channel access timeline techniques for wireless communications systems in accordance with one or more aspects of the present disclosure. The wireless communications system 300 may include a base station 105-b, a UE 115-c, and a UE 115-b, which may be examples of a base station 105 and UEs 115 as described with reference to FIG. 1. In some examples, the base station 105-b and the UE 115-c may be located in a geographic coverage area 110-a. The base station may communicate with the UE 115-c via downlink communication links and uplink communication links. In some examples, both the UE 115-c and the UE 115-d may be located outside of the geographic coverage area 110-a, and the UE 115-c may not communicate with the base station 105-b. Additionally, the UE 115-c may communicate with the UE 115-d via a sidelink communication link 315 (e.g., a PC5 link). For example, the UE 115-c may communicate sidelink communications using sidelink resources 316. In some examples, one or both of the UE 115-c and the UE 115-d may perform a resource selection procedure which may include sensing the sidelink resources 316 in a sensing window 320 and reserving resources in a resource selection window 325 of the sidelink resources 316 based on the sensing.

Sidelink communication may be described as communication between two or more wireless devices (e.g., communication between the UE 115-c and the UE 115-d). To facilitate sidelink communication, the UE 115-c and the UE 115-d may be configured with a set of resources (e.g., time and frequency resources) allocated for sidelink communication within one or more sidelink resource pools. A sidelink resource pool may include one or more subchannels in a frequency domain and one or more slots in a time domain. That is, the sidelink resource pool may include multiple resource elements 340.

In some examples, sidelink communication between the UE 115-c and the UE 115-d may be scheduled according to a sidelink resource allocation mode 1. During the sidelink resource allocation mode 1, the base station 105-b may indicate a set of resources within the one or more sidelink resource pools to a transmitting UE 115, and the transmitting UE 115 may utilize the set of resources for sidelink transmissions. For example, the base station 105-b may transmit, to the UE 115-c (e.g., a transmitting UE 115-c), an indication of a set of resources to use to transmit a message to the UE 115-d, and the UE 115-c may utilize one or more resources of the set to transmit the message to the UE 115-d. Alternatively, a transmitting UE 115, such as the UE 115-c, may select resources for sidelink transmissions according to a sidelink resource allocation mode 2. During the sidelink resource allocation mode 2, the UE 115-c may select a set of resources from the one or more sidelink resource pools for sidelink transmissions autonomously (without signaling from the base station 105a). In either case, the UE 115-c may transmit SCI to the UE 115-d indicating the selected set of resources such that the UE 115-d may locate and decode transmissions from the UE 115-c. As such, resource selection may vary between the sidelink resource allocation modes 1 and 2.

When a transmitting UE 115, such as the UE 115-c, is operating in sidelink resource allocation mode 2, the transmitting UE 115-c may perform a channel sensing procedure. In some examples, the UE 115-c may perform channel sensing in the sensing window 320. The sensing window 320 may be associated with the resource selection window 325. The resource selection window 325 may be subsequent to the sensing window 320 in a time domain and may include a set of resource candidates (e.g., resources that the transmitting UE 115-c may potentially transmit on). One or more of the resource candidates may be reserved for sidelink communication by one or more other UEs 115. As such, the UE 115-c may perform channel sensing during the sensing window 320 to determine an available set of resource candidates in the resource selection window 325. Sensing may refer to the UE 115-c monitoring for reference signaling on resource elements 340 of the sensing window 320. For example, the UE 115-c may monitor for SCI of other UEs 115 received on sidelink control resources 330. Decoding SCI of other UEs 115 may inform the UE 115-c which resources of the resource candidates in the resource selection window 325 are reserved for transmission by other UEs 115 (e.g., the reserved resources 335). In some examples, the UE 115-c may determine that all resources of the resource selection window 325 excluding the reserved resources 335 are available. The UE 115-c may additionally or alternatively measure a channel metric (e.g., a RSRP) associated with the SCI transmitted by other UEs 115 to determine whether the corresponding reserved resources 335 may be available for a transmission by the UE 115-c. If the UE 115-c determines that the measured signal strength of reference signaling corresponding to a reserved resource 335 is below a threshold, the UE 115-c may include the resource in the available set of resource candidates (e.g., the scheduled transmission in the reserved resource 335 may not interfere with a transmission by the UE 115-c). In some examples, the UE 115-c may increase or decrease the threshold based on a percentage of available resources in the resource selection window 325 or a priority associated with the scheduled transmission by the UE 115-c.

Once the UE 115-c determines the available resources, a physical layer may indicate the available resources to higher layers, and the higher layers may perform resource selection and reservation. In some examples, the selected resources may be reserved for a sidelink message, a retransmission of a sidelink message, or both. The UE 115-c may select and reserve resources such that all retransmission for a sidelink packet may occur within a configured delay period (e.g., a packet delay budget (PDB)). The UE 115-c may select the resources from the available set of resource candidates in response to receiving a resource selection trigger (e.g., an indication the UE 115-c has data to transmit). The duration from the start of the sensing window 320 and the resource selection trigger may be configured (e.g., 100 ms, 1100 ms, or some other duration). In some examples, the UE 115-c and the UE 115-d may confirm resource availability some time before the resource selection window 325 and the duration between the resource selection trigger to the end of the resource selection window 325 may be configured based on a priority and a sub-carrier spacing (SCS) (e.g., 15 kHz, 30 kHz, 60 kHz, 120 kHz, or some other SCS value).

In some examples, a sidelink UE 115 may support one or more duplex modes, which may correspond to whether the UE 115 transmits, receives, or both, at a time. For example, the UE 115-c, the UE 115-d, or both, may operate according to a half-duplex mode or a full-duplex mode. In a half-duplex mode, the UE 115-c may transmit and receive in different time resources. In a full-duplex mode, the UE 115-c may transmit and receive concurrently (e.g., in the same or overlapping time resources) using two or more antenna panels at the UE. Some full-duplex communications (e.g., in-band full-duplex) may correspond to transmission and reception on the same time and frequency resources. For example, resources allocated for a transmission by the UE 115-c may overlap in time and frequency with resources allocated for a reception by the UE 115-c (e.g., partial overlap or full overlap within the time and frequency resource). Other full-duplex communications (e.g., sub-band full-duplex) may correspond to transmission and reception at the same time (e.g., in the same time resources, such as a same slot), but in different frequency resources. For example, a resource allocated for a transmission by the UE 115-c may be separated from a resource allocated for reception by the UE 115-c in the frequency domain (e.g., in separate frequency bands), but may occur within a same slot in the time domain. In some examples, a guard band may be allocated between sub-band full-duplex resources in the frequency domain.

The UE 115-c may include one or more panels (e.g., transmission reception points (TRPs)) for simultaneous transmission and reception. For example, during full-duplex communications (e.g., sub-band full-duplex or in-band full-duplex) a first panel may be used for downlink reception and a second panel may be used for uplink transmission. In some examples, each panel may correspond to different frequency bands or different portions of a frequency band (e.g., for sub-band full duplex). If the UE 115-c operates in a half-duplex mode, the first and second panels may both be allocated for transmission or reception at a time.

In some examples, the sensing window 320 may be located in one or more full-duplex slots. As such, the UE 115-c may monitor for and receive reference signaling in the sensing window 320, and the UE 115-c may additionally or alternatively transmit uplink data, sidelink data, or both, in the sensing window 320. Simultaneously transmitting and sensing may introduce self-interference 345 at the UE 115-c. In addition, the UE 115-c may be subject to interference 350 from other sources, such as a base station (e.g., base station 105-b) or another UE. While the interference 350 is depicted in FIG. 3 as being received from the base station 105-b, such interference 350 may be received from any other source. Some or all of this interference may negatively impact the sensing procedure. For example, the interference may result in an inaccurate signal strength measurement associated with the reference signaling. For example, the interference may increase an RSRP measurement, and the UE 115-c may fail to account for the effect of the interference on the measurement, and the UE 115-c may determine that fewer resources are available which may result in relatively poor resource utilization in the system.

To reduce effects of the self-interference 345 and interference 350 on the channel sensing procedure as described herein, the UE 115-c may apply one or more interference cancellation techniques to reduce the self-interference 345 and interference 350. Additionally, or alternatively, the base station 105-b may transmit an interference cancellation configuration (e.g., an RRC configuration or other control signaling indicating a configuration) to the UE 115-c for performing interference cancellation in connection with channel sensing. The interference cancellation configuration may indicate different threshold values for performing the channel sensing with interference cancellation and without interference cancellation, or the interference cancellation configuration may instruct the UE 115-c to drop channel sensing if interference cancellation is not applied. Additionally, or alternatively, the UE 115-c may employ other interference cancellation techniques.

Such interference cancellation techniques may introduce additional processing time that may affect the channel sensing timeline, the resource selection timeline, or both. For example, the UE 115-c may apply an interference cancellation technique before performing channel sensing (e.g., decoding SCI or making RSRP measurements). To reduce or eliminate an effect to a channel sensing timeline, the UE 115-c may adjust a processing time associated with the channel sensing procedure (e.g., $T\_(proc,0)$) to a different value. For example, the processing time may be adjusted to a longer duration of time (e.g., a duration associated with full-duplex operation or interference cancelation procedures) than another duration of time (e.g., a duration associated with half-duplex operation).

Accordingly, a sidelink UE 115 as described herein may be configured with one or more parameters corresponding to a processing time associated with the channel sensing. The UE 115 may adjust the processing time associated with the channel sensing based on the one or more parameters and a full-duplex capability of the UE 115. The UE 115 may transmit, over a set of resources (e.g., resources determined based on the channel sensing), a sidelink message based on the adjusted processing time.

Figure 4A:
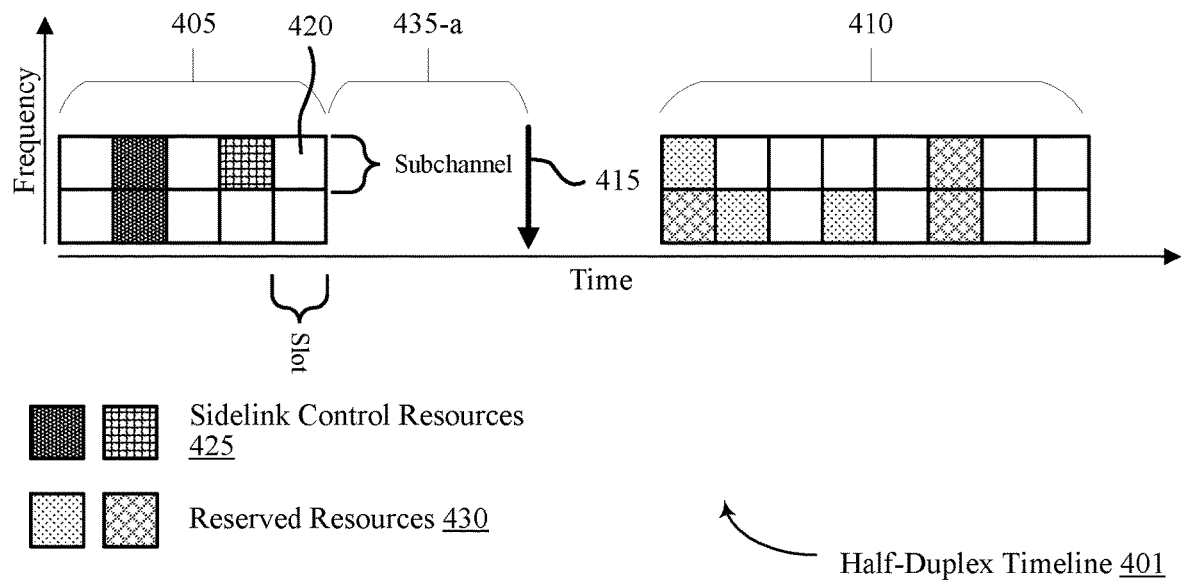
FIGS. 4A and 4B illustrate an example of a channel sensing scheme that supports sidelink channel access timeline techniques for wireless communications systems in accordance with one or more aspects of the present disclosure.
Figure 4B:
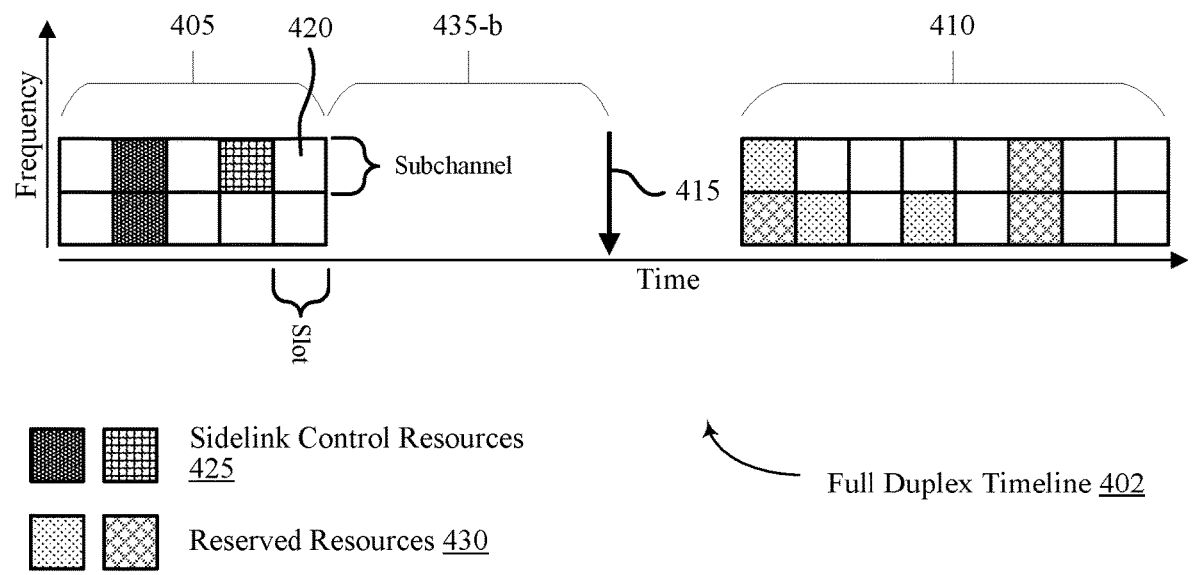

FIGS. 4A and 4B illustrate an example of a channel sensing scheme 400 that supports sidelink channel access timeline techniques for wireless communications systems in accordance with one or more aspects of the present disclosure. In some examples, the channel sensing scheme 400 may represent a scheme used by a UE 115 (e.g., a transmitting UE 115) to perform channel sensing and select sidelink resources for transmitting a sidelink message, as described with reference to FIG. 2. The UE 115 may communicate with one or more other UEs 115 using resource elements 420 (e.g., time and frequency resources) in a resource pool over a sidelink channel. The UE 115 and the one or more other UEs 115 may be examples of the UEs 115 described with reference to FIGS. 1 and 2. In some examples, the UE 115 may be configured with two or more channel metrics for performing channel sensing and resource selection.

As described with reference to FIG. 2, Some sidelink communications (e.g., V2X communications, or other device-to-device communications) may support autonomous resource allocation by a UE 115 (e.g., a mode 2 resource allocation). In such cases, the UE 115 (e.g., a transmitting UE 115) may access a channel based on sensing outcomes. For example, the UE 115 may identify available resources (e.g., time and frequency resources, such as resource elements 420) of a resource pool for a sidelink transmission based on a channel sensing procedure performed in a sensing window 405. If the UE 115 receives a resource selection trigger 415 (e.g., an indication from a higher layer that the UE 115 has sidelink data to transmit) after performing channel sensing, the UE 115 may select one or more resources from an available set of resource candidates in a corresponding resource selection window 410 for performing the sidelink transmission to one or more other UEs 115. The UE 115 may transmit a sidelink message to one or more other UEs 115 in the selected resources.

In the example of the channel sensing scheme 400, the UE 115 may monitor each resource element 420 (e.g., each slot and subchannel) during the sensing window 405 to identify an available set of resource candidates within the corresponding resource selection window 410. The resource selection window 410 may include a set of resource candidates, some of which may be reserved for communications by one or more other UEs 115 (e.g., the reserved resources 430), as described with reference to FIG. 2. The UE 115 may identify the available set of resource candidates from the set of resource candidates based on a measured channel metric level of corresponding reference signaling, SCI, or both, received by the UE 115 within one or more of the sidelink control resources 425 in the sensing window 405.

In some cases, the UE 115 may operate in a full-duplex mode while performing channel sensing. The full-duplex mode may correspond to the UE 115 performing a transmission (e.g., an uplink transmission, a sidelink transmission, or both) during the sensing window 405 while measuring the reference signaling (e.g., concurrent uplink and downlink communications). The UE 115 may experience self-interference, or other types of interference due to the full-duplex communications, which may provide for an inaccurate channel metric measurement. For example, the interference may result in an increased value of a measured channel metric level, such as a RSRP measurement.

As described herein, the UE 115 may apply one or more interference cancellation techniques to reduce the self-interference and interference (e.g., the self-interference 345 and interference 350 described in relation to FIG. 3). Such interference cancellation techniques may introduce additional processing time that may affect the channel sensing timeline. To reduce or eliminate adverse effects on the channel sensing timeline, the UE 115 may adjust a processing time 435 based on one or more parameters that the UE 115 may receive in a configuration associated with channel sensing and sidelink communication. For example, the UE 115 may implement the half-duplex timeline 401 shown in FIG. 4A or the full duplex timeline 402 shown in FIG. 4B based on whether the UE 115 is configured to perform half-duplex communications or full duplex communications.

In FIG. 4A, the processing time 435-a may be a processing time associated with half-duplex operation (e.g., in which interference cancellation may not be performed). The processing time 435-a may be a length that is sufficient for the UE 115 to perform processing related with the channel sensing. However, as shown in FIG. 4B, the UE 115 may adjust the processing time 435-b to be of a different duration than the processing time 435-a shown in FIG. 4A. For example, in FIG. 4B the processing time 435-b may be a processing time associated with full-duplex operation. That is, the processing time 435-b may be of a longer duration, such that the UE 115 may perform interference techniques (e.g., interference calculation for interference cancellation techniques) before engaging some or all of the channel sensing procedure (e.g., which may include SCI decoding and RSRP measurement). By adjusting the processing time 435-b to a longer duration, the UE 115 may be enabled with a time length sufficient to perform the interference cancellation procedure. In some examples, the UE 115 may maintain a length of the channel sensing timeline. For example, the UE 115 may use a same length of time for the sensing window 405 which may result in improved channel sensing. In some other examples, the UE 115 may reduce a duration of the sensing window 405 (e.g., the UE 115 may increase the processing time 435-b by reducing the time for the sensing window 405 in addition or alternative to implementing a longer processing time 435-b).

Alternatively, or additionally, the UE 115 may also perform additional operations based on one or more priority levels associated with one or more messages (e.g., in order to avoid disrupting the channel sensing timeline or causing other errors).

In some examples, a UE 115 with a full-duplex capability may perform channel sensing associated with a low latency data message to be transmitted by the UE 115, and may drop a second data message being transmitted by the UE 115 if the second data message is of a low priority. For example, the UE 115 may be monitoring resource elements in connection with the channel sensing procedure, while, in at least partially overlapping time resources, transmitting the second data message. However, the UE 115 may perform interference cancellation associated with the channel sensing, since the UE 115 is operating in a full-duplex mode and may disrupt the channel sensing timeline as a result. To reduce or avoid such disruption, the UE 115 may drop the transmission of the second data message that is associated with a low priority, since the low-latency data message is associated with a higher priority. Alternatively, or additionally, the UE 115 may replace the transmission of the second data message associated with a low priority with the transmission of the low latency data message that may be associated with a high priority.

Alternatively, or additionally, the UE 115 may not drop the transmission of the second data message associated with a low priority and may further abstain from performing the interference cancellation procedure, thus reducing or avoiding the adverse impact on the channel sensing timeline. In some such examples, the UE 115 may perform an alternative procedure to account for self-interference or other interference received (e.g., implement a modified offset value associated with the RSRP), as described herein with reference to FIG. 2. Alternatively, or additionally, the UE 115 may not drop the transmission of the second data message associated with a low priority and may further perform the interference cancellation procedure.

Figure 5:
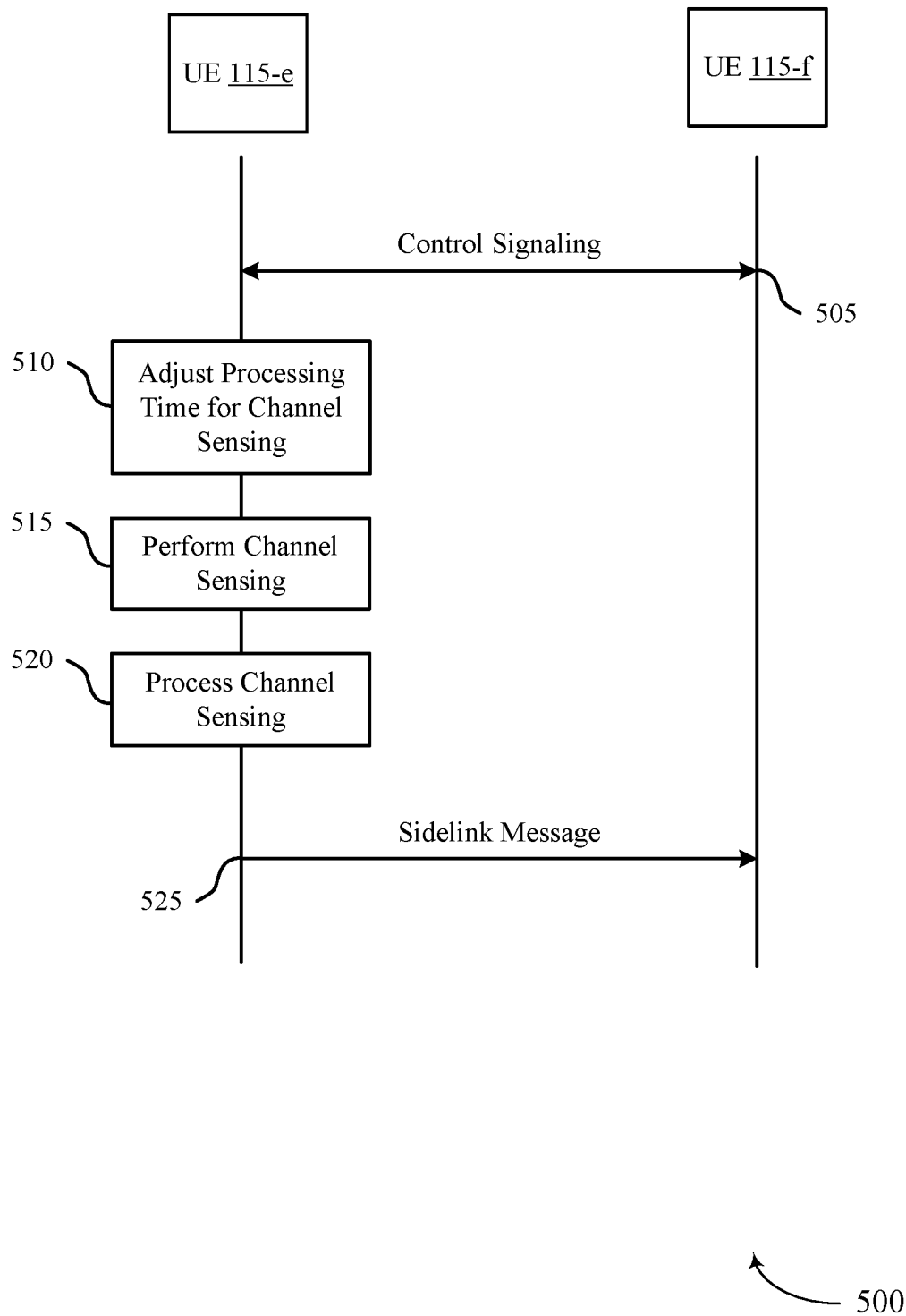
FIG. 5 illustrates an example of a process flow that supports sidelink channel access timeline techniques for wireless communications systems in accordance with one or more aspects of the present disclosure.

FIG. 5 illustrates an example of a process flow 500 that supports sidelink channel access timeline techniques for wireless communications systems in accordance with one or more aspects of the present disclosure. The process flow 500 may implement various aspects of the present disclosure described with reference to FIGS. 1-3. The process flow 500 may include a UE 115-e, and a UE 115-f, which may be examples of UEs 115 as described with reference to FIGS. 1-4. In some examples, the UE 115-e may be configured with a one or more parameters for corresponding to a processing time for performing a channel sensing procedure of a sidelink resource selection procedure.

In the following description of the process flow 500, the operations between the UEs 115-c, 115-d, may be performed in different orders or at different times. Some operations may also be left out of the process flow 500, or other operations may be added. Although the UE 115-e, and the UE 115-f are shown performing the operations of the process flow 500, some aspects of some operations may also be performed by one or more other wireless devices.

At 505, UE 115-e may receive control signaling indicating a configuration for performing channel sensing. In some examples, the received control signaling may include an RRC message, a DCI message, a MAC-CE message, or any combination thereof, among other examples of control signaling. The configuration may include (e.g., indicate) one or more parameters corresponding to a processing time associated with the channel sensing. In some examples, the one or more parameters may include a first parameter indicating a first duration for the processing time and a second parameter indicating a second duration for the processing time, the first duration corresponding to a first interference cancellation capability of the first UE and the second duration corresponding to a second interference cancellation capability of the first UE. In some examples, the UE 115-e may transmit a capability message indicating a full duplex capability as described herein.

At 510, UE 115-e may adjust the processing time associated with the channel sensing based on the one or more parameters and a full duplex capability of the UE 115-e. In some examples, UE 115-e may increase a first duration of the processing time associated with a half-duplex capability to a second duration for the processing time associated with the full duplex capability of the UE 115-e, wherein the one or more parameters indicate the second duration. In some examples, the UE 115-e may reduce a duration of a sensing window associated with the channel sensing based on the full duplex capability of the UE 115-*e*. The UE 115-*e* may also increase a first duration for the processing time associated with a half-duplex capability to a second duration for the processing time associated with the full duplex capability of the UE 115-*e*, wherein the one or more parameters indicate the second duration. In some examples, the UE 115-*e* may adjust the processing time to the first duration based on the UE 115-*e* operating in a half-duplex mode, the second duration based on the UE 115-*e* operating in a full duplex mode, or a combination thereof. In some examples, the UE 115-*e* may adjust a beginning of a resource selection window based on increasing the first duration to the second duration At 515, UE 115-*e* may perform the channel sensing. In some examples, the UE 115-*e* may perform the channel sensing using the adjusted processing time as described herein with reference to FIGS. 1-4.

At 520, UE 115-*e* may process the channel sensing. For example, the UE 115-*e* may select the first set of resources based on a result of the channel sensing as described herein with reference to FIGS. 1-4 (e.g., the UE 115-*e* may perform interference cancellation or other interference techniques, measurement techniques, etc., as part of the processing).

At 525, UE 115-*e* may transmit, to the UE 115-*f* using a first set of resources, a sidelink message based on the adjusted processing time. In some examples, transmitting the sidelink message may be based on the selected first set of resources (e.g., the UE 115-*f* may select the first set of resources and transmit the sidelink message over the first set of resources).

Figure 6:
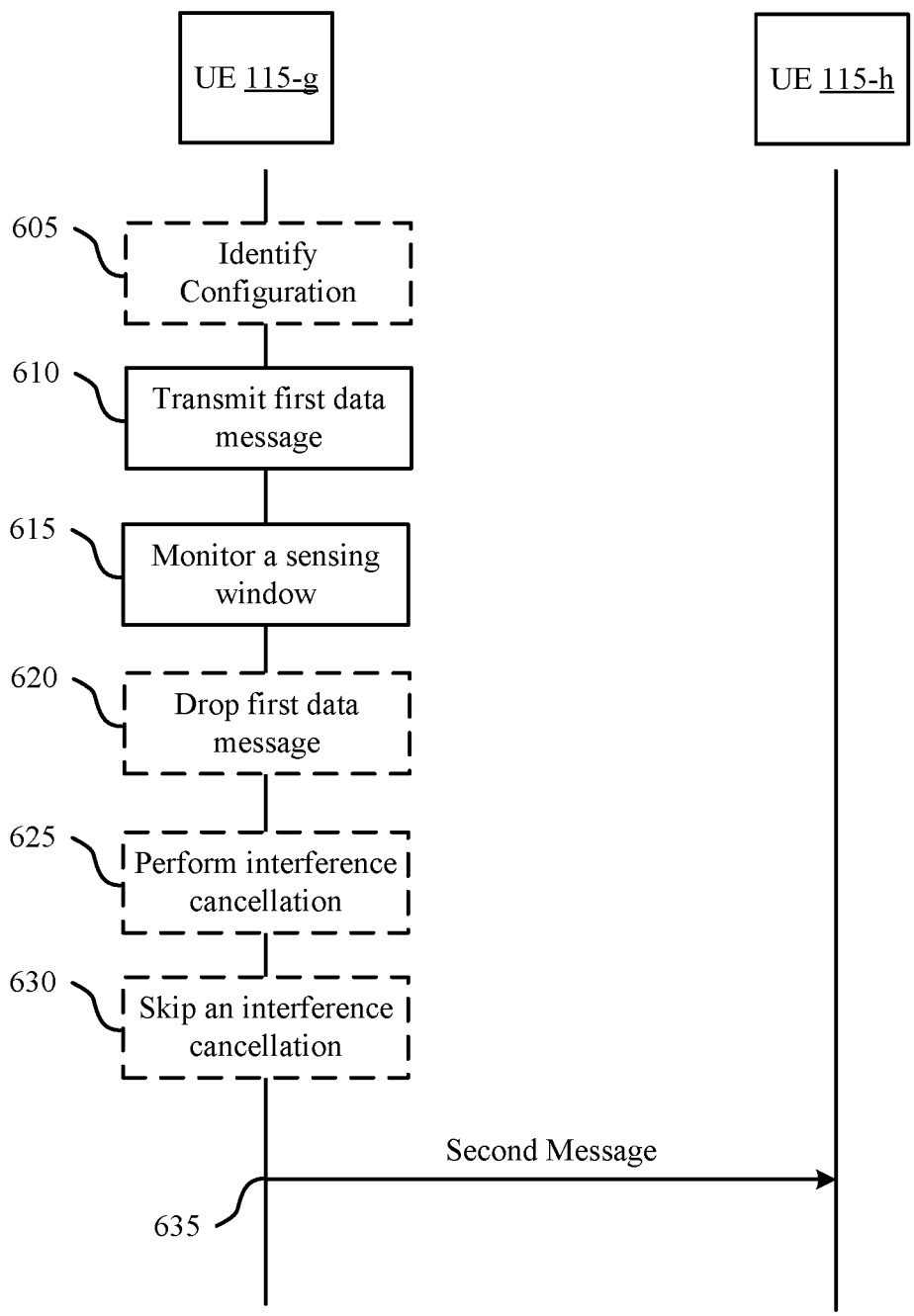
FIG. 6 illustrates an example of a process flow that supports sidelink channel access timeline techniques for wireless communications systems in accordance with one or more aspects of the present disclosure.

FIG. 6 illustrates an example of a process flow 600 that supports sidelink channel access timeline techniques for wireless communications systems in accordance with one or more aspects of the present disclosure. The process flow 600 may implement various aspects of the present disclosure described with reference to FIGS. 1-3. The process flow 600 may include a UE 115-*g*, and a UE 115-*h*, which may be examples of UEs 115 as described with reference to FIGS. 1-5. In some examples, the UE 115-*g* may be configured with a one or more parameters for corresponding to a processing time for performing a channel sensing procedure of a sidelink resource selection procedure.

In the following description of the process flow 600, the operations between the UEs 115-*c*, 115-*d*, may be performed in different orders or at different times. Some operations may also be left out of the process flow 600, or other operations may be added. Although the UE 115-*g*, and the UE 115-*h* are shown performing the operations of the process flow 600, some aspects of some operations may also be performed by one or more other wireless devices.

In some examples, at 605 the UE 115-*g* may identify a configuration, for example, associated with low-latency messaging. In some examples, the configuration may be pre-configured. In some examples, the configuration may be signaled to the UE 115-*g* (e.g., the configuration may be signaled to the UE 115-*g* via an RRC message, a DCI message, a MAC-CE message, or any combination thereof, among other examples of control signaling). In some examples, the UE 115-*g* may receive control signaling indicating an adjustment parameter.

At 610 the UE 115-*g* may transmit, using a first set of resources, a first data message associated with a first priority level.

At 615, the UE 115-*a* may monitor a sensing window using the full duplex capability of the first UE for a first duration. In some examples, the UE 115-*g* may obtain a measurement of a sensing window associated with the channel sensing. In some examples, the UE 115-*g* may modify the measurement using the adjustment parameter based on skipping the interference cancellation. In some examples, the UE 115-*g* may perform channel sensing for a second data message to be transmitted to a second UE, the second data message associated with a second priority level that is higher than the first priority level. In some examples, the second data message may include a low latency message. In some examples, the second data message may include a low latency message. In some examples, the UE 115-*g* may select a second set of resources based on the channel sensing and the modified measurement. In some examples, the UE 115-*g* may select a second set of resources based on performing the channel sensing and dropping the first data message In some examples, the UE 115-*g* may select a second set of resources based on performing the channel sensing and skipping the interference cancellation.

In some examples, at 620 the UE 115-*g* may drop the first data message during the channel sensing based on the second data message being associated with the second priority level. For example, the UE 115-*g* may drop the first data message as described herein with reference to FIGS. 2-4.

In some examples, at 625 the UE 115-*g* may perform an interference cancellation for the channel sensing during the adjusted processing time based on monitoring the sensing window using the full duplex capability of the UE 115-*g*. In some examples, during the channel sensing, the UE 115-*g* may also be transmitting a message while performing the channel sensing. Such a transmission may introduce self-interference, for which the UE 115-*g* may perform interference cancellation. Similarly, the UE 115-*g* may perform interference cancellation to cancel interference from other sources (e.g., a base station or another UE). In some examples, at 630 the UE 115-*g* may skip an interference cancellation for the channel sensing based on the second data message being associated with the second priority level.

At 635 the UE 115-*g* may transmit the second data message using the selected second set of resources. In some examples, the UE 115-*g* may transmit the second data message using the first set of resources based on dropping the first data message. In some examples, the UE 115-*g* may transmit the second data message using the selected second set of resources.

Figure 7:
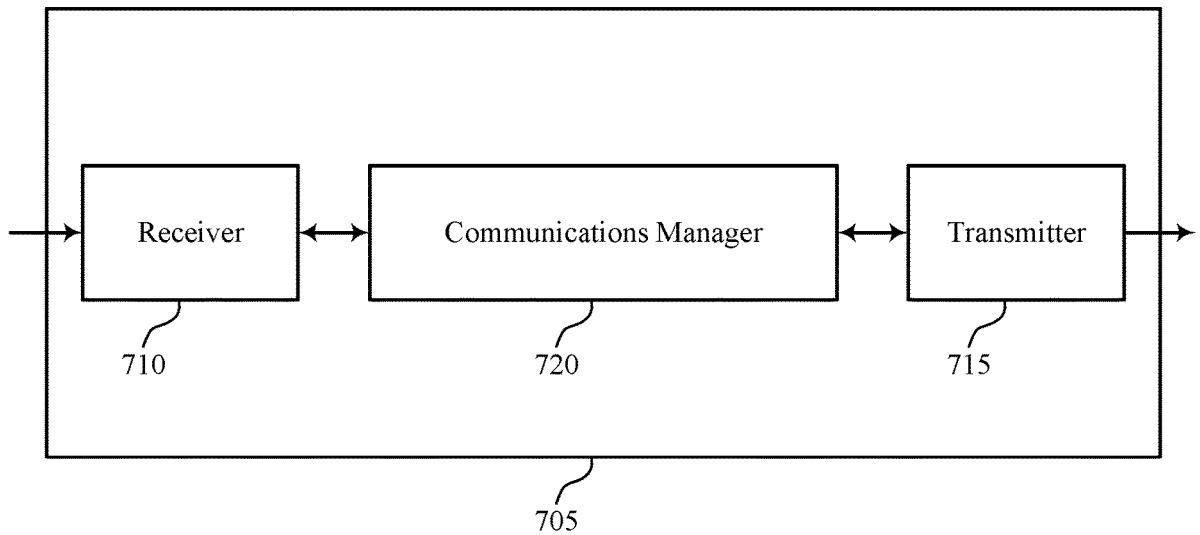
FIGS. 7 and 8 show block diagrams of devices that support sidelink channel access timeline techniques for wireless communications systems in accordance with one or more aspects of the present disclosure.

FIG. 7 shows a block diagram 700 of a device 705 that supports sidelink channel access timeline techniques for wireless communications systems in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to sidelink channel access timeline techniques for wireless communications systems). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to sidelink channel access timeline techniques for wireless communications systems). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of sidelink channel access timeline techniques for wireless communications systems as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first UE in accordance with examples as disclosed herein. For example, the communications manager 720 may be configured as or otherwise support a means for receiving control signaling indicating a configuration for performing channel sensing, the configuration including one or more parameters corresponding to a processing time associated with the channel sensing. The communications manager 720 may be configured as or otherwise support a means for adjusting the processing time associated with the channel sensing based on the one or more parameters and a full duplex capability of the first UE. The communications manager 720 may be configured as or otherwise support a means for transmitting, to a second UE using a first set of resources, a sidelink message based on the adjusted processing time.

Additionally or alternatively, the communications manager 720 may support wireless communications at a first UE capable of operating in a full duplex mode in accordance with examples as disclosed herein. For example, the communications manager 720 may be configured as or otherwise support a means for transmitting, using a first set of resources, a first data message associated with a first priority level. The communications manager 720 may be configured as or otherwise support a means for performing channel sensing for a second data message to be transmitted to a second UE, the second data message associated with a second priority level that is higher than the first priority level. The communications manager 720 may be configured as or otherwise support a means for dropping the first data message during the channel sensing based on the second data message being associated with the second priority level.

Additionally or alternatively, the communications manager 720 may support wireless communications at a first UE capable of operating in a full duplex mode in accordance with examples as disclosed herein. For example, the communications manager 720 may be configured as or otherwise support a means for transmitting, using a first set of resources, a first data message associated with a first priority level. The communications manager 720 may be configured as or otherwise support a means for performing channel sensing for a second data message to be transmitted to a second UE, the second data message associated with a second priority level that is higher than the first priority level. The communications manager 720 may be configured as or otherwise support a means for skipping an interference cancellation for the channel sensing based on the second data message being associated with the second priority level.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for sidelink channel access timeline adjustment and low latency messaging as described herein. For example, the device 705 may be configured to adjust a processing time for a sensing procedure to accommodate an interference cancellation procedure for a full duplex capability of the device 705, which may result in improved communications reliability, reduced power consumption, and the like. Additionally or alternatively, the device 705 may implement techniques to drop a low priority message or skip interference cancelation, which may reduce a latency for high priority messages.

Figure 8:
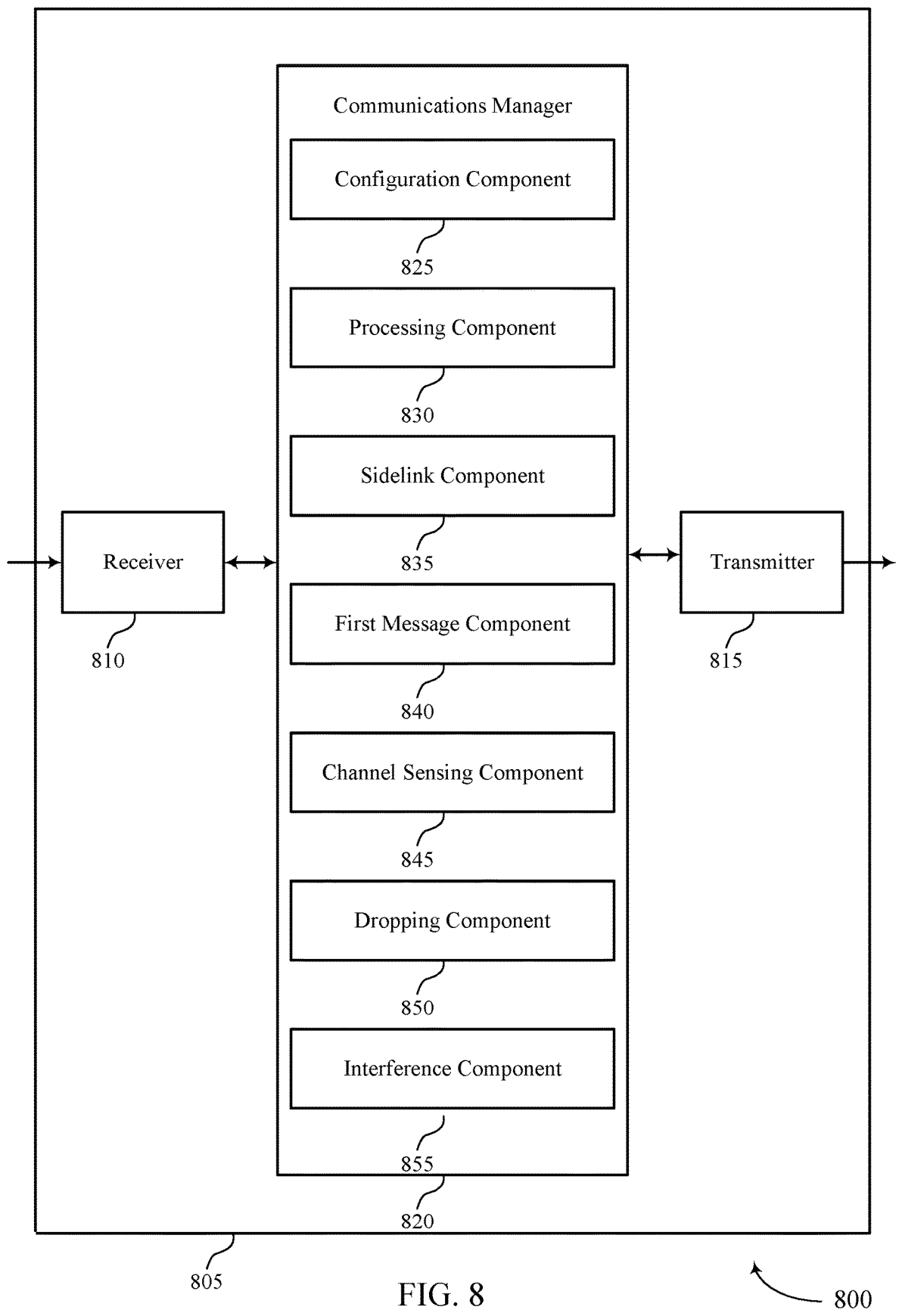

FIG. 8 shows a block diagram 800 of a device 805 that supports sidelink channel access timeline techniques for wireless communications systems in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to sidelink channel access timeline techniques for wireless communications systems). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to sidelink channel access timeline techniques for wireless communications systems). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of sidelink channel access timeline techniques for wireless communications systems as described herein. For example, the communications manager 820 may include a configuration component 825, a processing component 830, a sidelink component 835, a first message component 840, a channel sensing component 845, a dropping component 850, an interference component 855, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a first UE in accordance with examples as disclosed herein. The configuration component 825 may be configured as or otherwise support a means for receiving control signaling indicating a configuration for performing channel sensing, the configuration including one or more parameters corresponding to a processing time associated with the channel sensing. The processing component 830 may be configured as or otherwise support a means for adjusting the processing time associated with the channel sensing based on the one or more parameters and a full duplex capability of the first UE. The sidelink component 835 may be configured as or otherwise support a means for transmitting, to a second UE using a first set of resources, a sidelink message based on the adjusted processing time.

Additionally or alternatively, the communications manager 820 may support wireless communications at a first UE capable of operating in a full duplex mode in accordance with examples as disclosed herein. The first message component 840 may be configured as or otherwise support a means for transmitting, using a first set of resources, a first data message associated with a first priority level. The channel sensing component 845 may be configured as or otherwise support a means for performing channel sensing for a second data message to be transmitted to a second UE, the second data message associated with a second priority level that is higher than the first priority level. The dropping component 850 may be configured as or otherwise support a means for dropping the first data message during the channel sensing based on the second data message being associated with the second priority level.

Additionally or alternatively, the communications manager 820 may support wireless communications at a first UE capable of operating in a full duplex mode in accordance with examples as disclosed herein. The first message component 840 may be configured as or otherwise support a means for transmitting, using a first set of resources, a first data message associated with a first priority level. The channel sensing component 845 may be configured as or otherwise support a means for performing channel sensing for a second data message to be transmitted to a second UE, the second data message associated with a second priority level that is higher than the first priority level. The interference component 855 may be configured as or otherwise support a means for skipping an interference cancellation for the channel sensing based on the second data message being associated with the second priority level.

Figure 9:
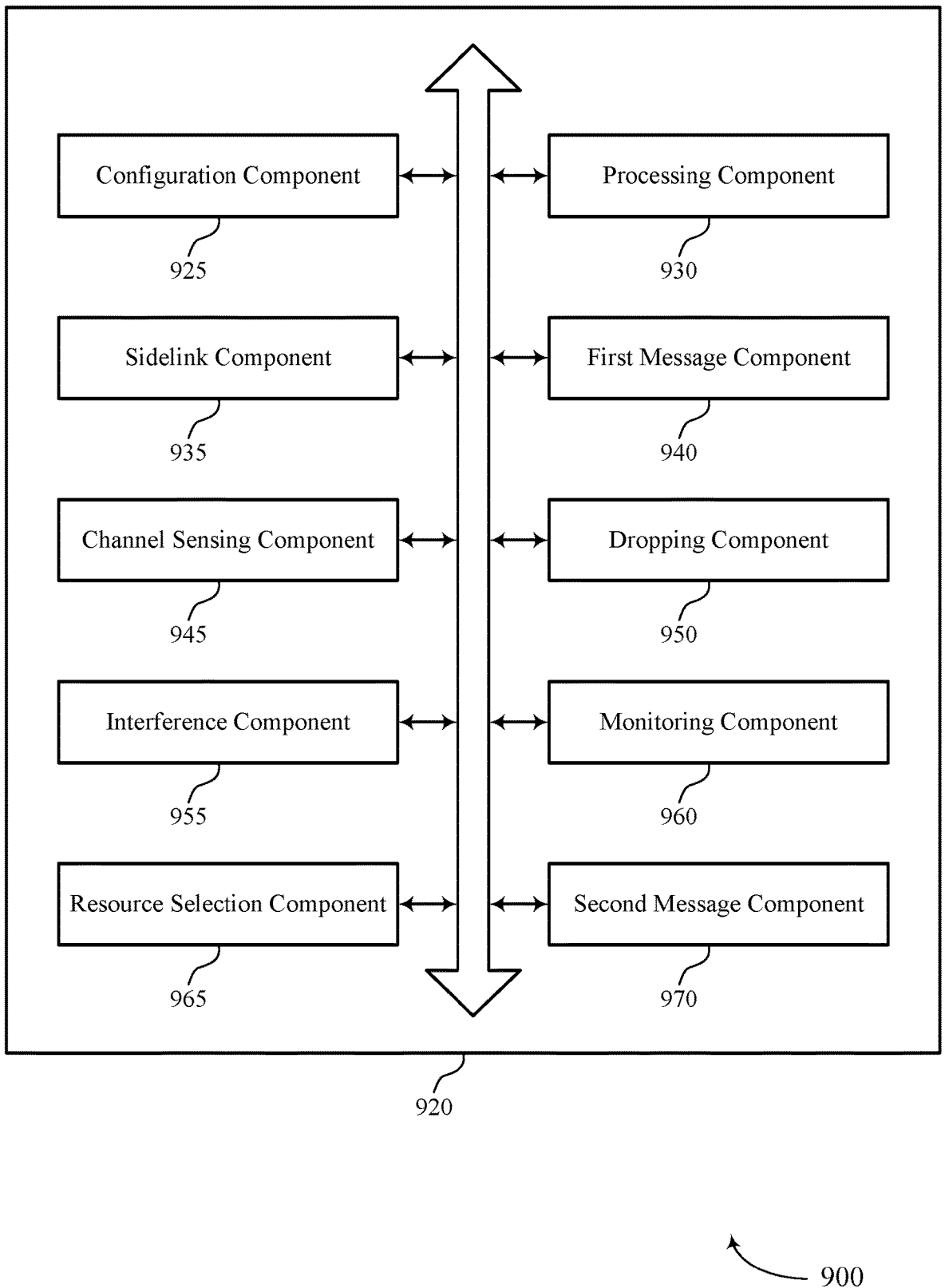
FIG. 9 shows a block diagram of a communications manager that supports sidelink channel access timeline techniques for wireless communications systems in accordance with one or more aspects of the present disclosure.

FIG. 9 shows a block diagram 900 of a communications manager 920 that supports sidelink channel access timeline techniques for wireless communications systems in accordance with one or more aspects of the present disclosure. The communications manager 920 may be an example of aspects of a communications manager 720, a communications manager 820, or both, as described herein. The communications manager 920, or various components thereof, may be an example of means for performing various aspects of sidelink channel access timeline techniques for wireless communications systems as described herein. For example, the communications manager 920 may include a configuration component 925, a processing component 930, a sidelink component 935, a first message component 940, a channel sensing component 945, a dropping component 950, an interference component 955, a monitoring component 960, a resource selection component 965, a second message component 970, or any combination thereof. Each of these components may communicate, directly or indirectly, with one another (e.g., via one or more buses).

The communications manager 920 may support wireless communications at a first UE in accordance with examples as disclosed herein. The configuration component 925 may be configured as or otherwise support a means for receiving control signaling indicating a configuration for performing channel sensing, the configuration including one or more parameters corresponding to a processing time associated with the channel sensing. The processing component 930 may be configured as or otherwise support a means for adjusting the processing time associated with the channel sensing based on the one or more parameters and a full duplex capability of the first UE. The sidelink component 935 may be configured as or otherwise support a means for transmitting, to a second UE using a first set of resources, a sidelink message based on the adjusted processing time.

In some examples, to support adjusting the processing time, the processing component 930 may be configured as or otherwise support a means for increasing a first duration of the processing time associated with a half-duplex capability to a second duration for the processing time associated with the full duplex capability of the first UE, where the one or more parameters indicate the second duration.

In some examples, the processing component 930 may be configured as or otherwise support a means for adjusting a beginning of a resource selection window based on increasing the first duration to the second duration.

In some examples, to support adjusting the processing time, the processing component 930 may be configured as or otherwise support a means for reducing a duration of a sensing window associated with the channel sensing based on the full duplex capability of the first UE. In some examples, to support adjusting the processing time, the processing component 930 may be configured as or otherwise support a means for increasing a first duration for the processing time associated with a half-duplex capability to a second duration for the processing time associated with the full duplex capability of the first UE, where the one or more parameters indicate the second duration.

In some examples, the received control signaling includes a radio resource control message, a downlink control information message, a medium access control control element message, or any combination thereof.

In some examples, the one or more parameters include a first parameter indicating a first duration for the processing time and a second parameter indicating a second duration for the processing time, the first duration corresponding to a first interference cancellation capability of the first UE and the second duration corresponding to a second interference cancellation capability of the first UE.

In some examples, the processing component 930 may be configured as or otherwise support a means for adjusting the processing time to the first duration based on the first UE operating in a half-duplex mode, the second duration based on the first UE operating in a full duplex mode, or a combination thereof.

In some examples, the monitoring component 960 may be configured as or otherwise support a means for monitoring a sensing window using the full duplex capability of the first UE for a first duration. In some examples, the interference component 955 may be configured as or otherwise support a means for performing an interference cancellation for the channel sensing during the adjusted processing time based on monitoring the sensing window using the full duplex capability of the first UE.

In some examples, the channel sensing component 945 may be configured as or otherwise support a means for performing the channel sensing using the adjusted processing time.

In some examples, the resource selection component 965 may be configured as or otherwise support a means for selecting the first set of resources based on a result of the channel sensing, where transmitting the sidelink message is based on the selected first set of resources.

Additionally or alternatively, the communications manager 920 may support wireless communications at a first UE capable of operating in a full duplex mode in accordance with examples as disclosed herein. The first message component 940 may be configured as or otherwise support a means for transmitting, using a first set of resources, a first data message associated with a first priority level. The channel sensing component 945 may be configured as or otherwise support a means for performing channel sensing for a second data message to be transmitted to a second UE, the second data message associated with a second priority level that is higher than the first priority level. The dropping component 950 may be configured as or otherwise support a means for dropping the first data message during the channel sensing based on the second data message being associated with the second priority level.

In some examples, the resource selection component 965 may be configured as or otherwise support a means for selecting a second set of resources based on performing the channel sensing and dropping the first data message. In some examples, the second message component 970 may be configured as or otherwise support a means for transmitting the second data message using the selected second set of resources.

In some examples, the second message component 970 may be configured as or otherwise support a means for transmitting the second data message using the first set of resources based on dropping the first data message. In some examples, the second data message includes a low latency message.

Additionally or alternatively, the communications manager 920 may support wireless communications at a first UE capable of operating in a full duplex mode in accordance with examples as disclosed herein. In some examples, the first message component 940 may be configured as or otherwise support a means for transmitting, using a first set of resources, a first data message associated with a first priority level. In some examples, the channel sensing component 945 may be configured as or otherwise support a means for performing channel sensing for a second data message to be transmitted to a second UE, the second data message associated with a second priority level that is higher than the first priority level. The interference component 955 may be configured as or otherwise support a means for skipping an interference cancellation for the channel sensing based on the second data message being associated with the second priority level.

In some examples, the resource selection component 965 may be configured as or otherwise support a means for selecting a second set of resources based on performing the channel sensing and skipping the interference cancellation. In some examples, the second message component 970 may be configured as or otherwise support a means for transmitting the second data message using the selected second set of resources.

In some examples, the channel sensing component 945 may be configured as or otherwise support a means for determining a measurement of a sensing window associated with the channel sensing. In some examples, the channel sensing component 945 may be configured as or otherwise support a means for modifying the measurement using an adjustment parameter based on skipping the interference cancellation.

In some examples, the configuration component 925 may be configured as or otherwise support a means for receiving control signaling indicating the adjustment parameter.

In some examples, the resource selection component 965 may be configured as or otherwise support a means for selecting a second set of resources based on the channel sensing and the modified measurement. In some examples, the second message component 970 may be configured as or otherwise support a means for transmitting the second data message using the selected second set of resources. In some examples, the second data message includes a low latency message.

Figure 10:
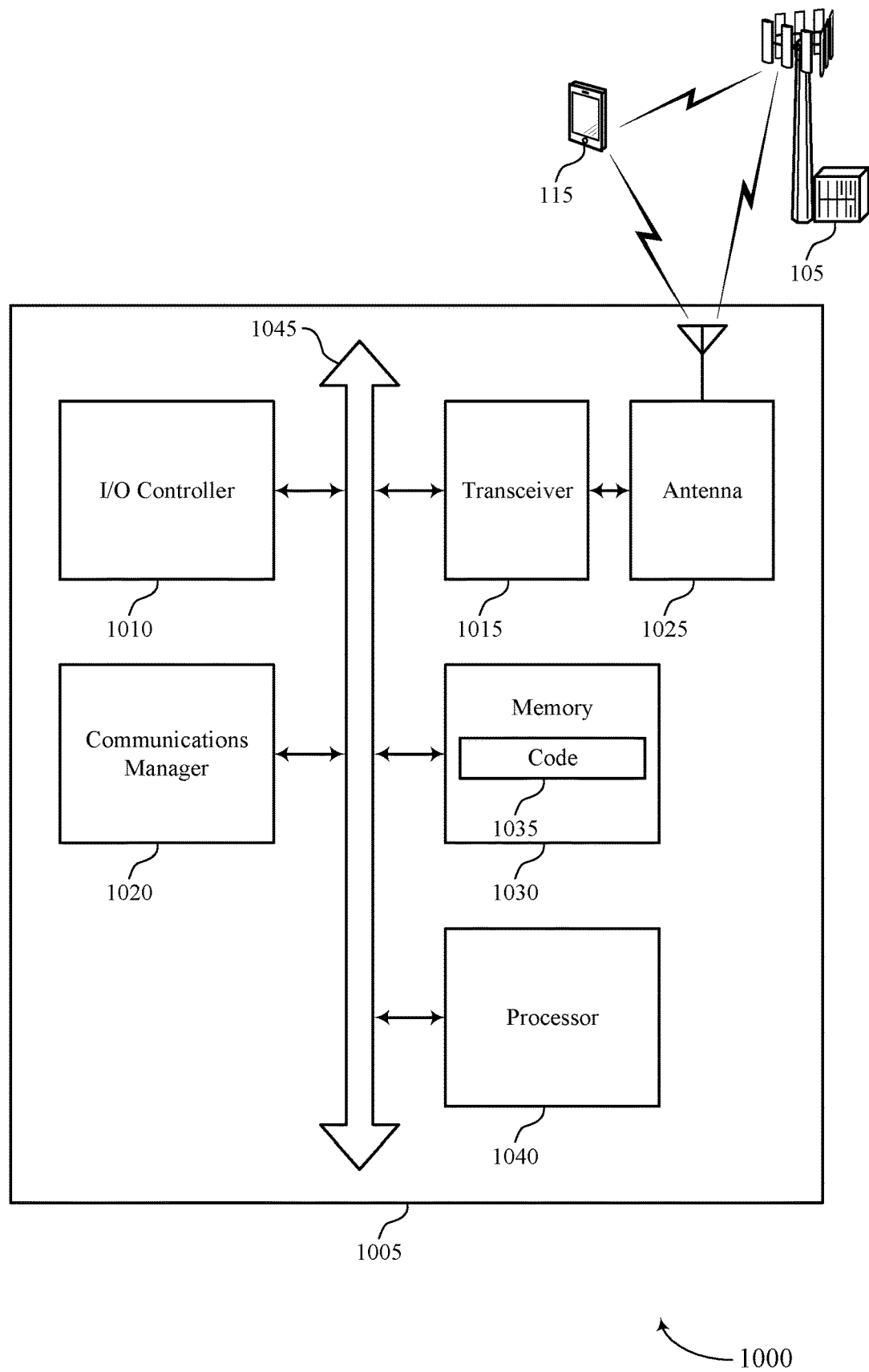
FIG. 10 shows a diagram of a system including a device that supports sidelink channel access timeline techniques for wireless communications systems in accordance with one or more aspects of the present disclosure.

FIG. 10 shows a diagram of a system 1000 including a device 1005 that supports sidelink channel access timeline techniques for wireless communications systems in accordance with one or more aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting sidelink channel access timeline techniques for wireless communications systems). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a first UE in accordance with examples as disclosed herein. For example, the communications manager 1020 may be configured as or otherwise support a means for receiving control signaling indicating a configuration for performing channel sensing, the configuration including one or more parameters corresponding to a processing time associated with the channel sensing. The communications manager 1020 may be configured as or otherwise support a means for adjusting the processing time associated with the channel sensing based on the one or more parameters and a full duplex capability of the first UE. The communications manager 1020 may be configured as or otherwise support a means for transmitting, to a second UE using a first set of resources, a sidelink message based on the adjusted processing time.

Additionally or alternatively, the communications manager 1020 may support wireless communications at a first UE capable of operating in a full duplex mode in accordance with examples as disclosed herein. For example, the communications manager 1020 may be configured as or otherwise support a means for transmitting, using a first set of resources, a first data message associated with a first priority level. The communications manager 1020 may be configured as or otherwise support a means for performing channel sensing for a second data message to be transmitted to a second UE, the second data message associated with a second priority level that is higher than the first priority level. The communications manager 1020 may be configured as or otherwise support a means for dropping the first data message during the channel sensing based on the second data message being associated with the second priority level.

Additionally or alternatively, the communications manager 1020 may support wireless communications at a first UE capable of operating in a full duplex mode in accordance with examples as disclosed herein. For example, the communications manager 1020 may be configured as or otherwise support a means for transmitting, using a first set of resources, a first data message associated with a first priority level. The communications manager 1020 may be configured as or otherwise support a means for performing channel sensing for a second data message to be transmitted to a second UE, the second data message associated with a second priority level that is higher than the first priority level. The communications manager 1020 may be configured as or otherwise support a means for skipping an interference cancellation for the channel sensing based on the second data message being associated with the second priority level.

By including or configuring the communications manager 1020 in accordance with examples as described herein, the device 1005 may support techniques for sidelink channel access timeline adjustment and low latency messaging as described herein. For example, the device 1005 may be configured to adjust a processing time for a sensing procedure to accommodate an interference cancellation procedure for a full duplex capability of the device 1005, which may result in improved communications reliability, reduced power consumption, and the like. Additionally or alternatively, the device 1005 may implement techniques to drop a low priority message or skip interference cancelation, which may reduce a latency for high priority messages.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of sidelink channel access timeline techniques for wireless communications systems as described herein, or the processor 1040 and the memory 1030 may be otherwise configured to perform or support such operations.

Figure 11:
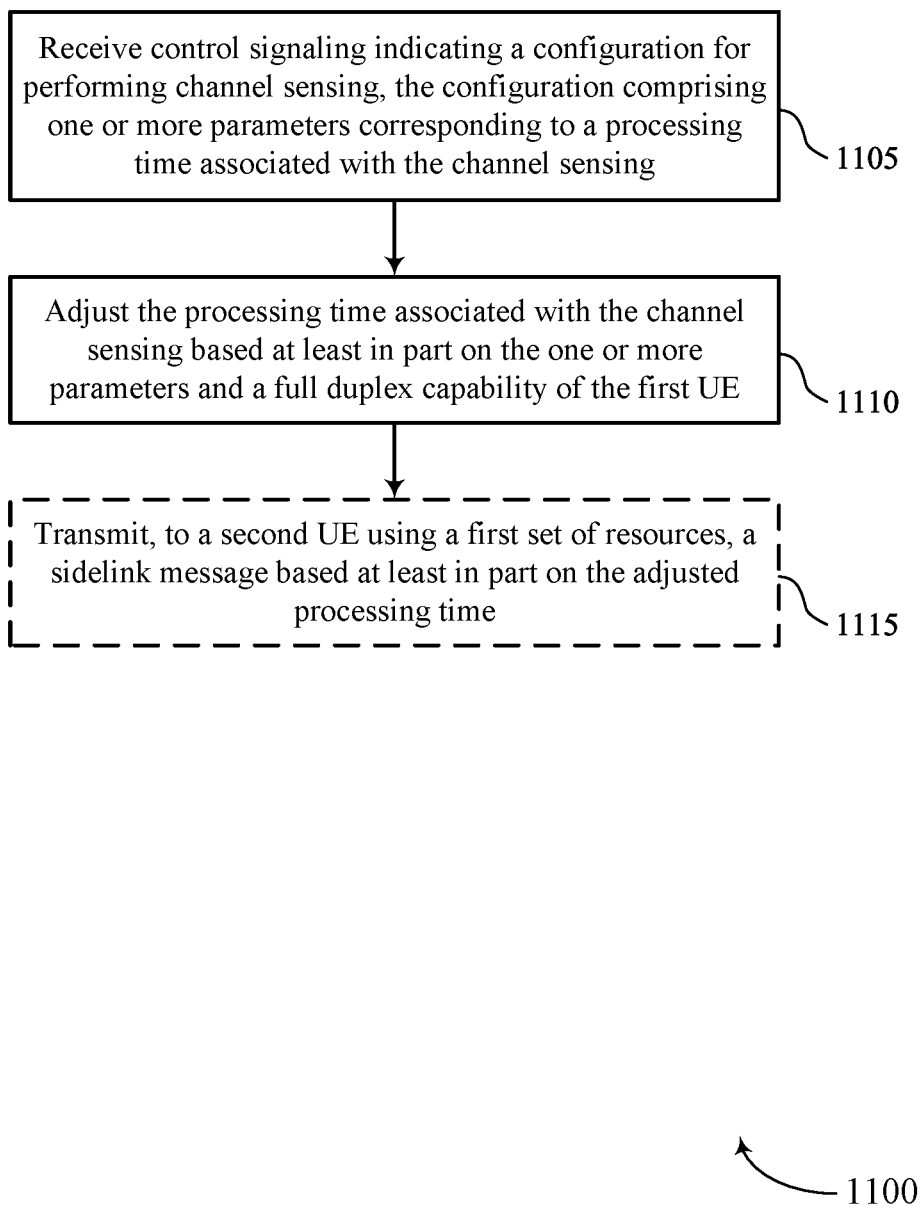
FIGS. 11 through 13 show flowcharts illustrating methods that support sidelink channel access timeline techniques for wireless communications systems in accordance with one or more aspects of the present disclosure.

FIG. 11 shows a flowchart illustrating a method 1100 that supports sidelink channel access timeline techniques for wireless communications systems in accordance with one or more aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1105, the method may include receiving control signaling indicating a configuration for performing channel sensing, the configuration including one or more parameters corresponding to a processing time associated with the channel sensing. The operations of 1105 may be performed in accordance with examples as disclosed herein. In some examples, aspects of the operations of 1105 may be performed by a configuration component 925 as described with reference to FIG. 9.

At 1110, the method may include adjusting the processing time associated with the channel sensing based on the one or more parameters and a full duplex capability of the first UE. The operations of 1110 may be performed in accordance with examples as disclosed herein. In some examples, aspects of the operations of 1110 may be performed by a processing component 930 as described with reference to FIG. 9.

In some examples, at 1115 the method may include transmitting, to a second UE using a first set of resources, a sidelink message based on the adjusted processing time. The operations of 1115 may be performed in accordance with examples as disclosed herein. In some examples, aspects of the operations of 1115 may be performed by a sidelink component 935 as described with reference to FIG. 9.

Figure 12:
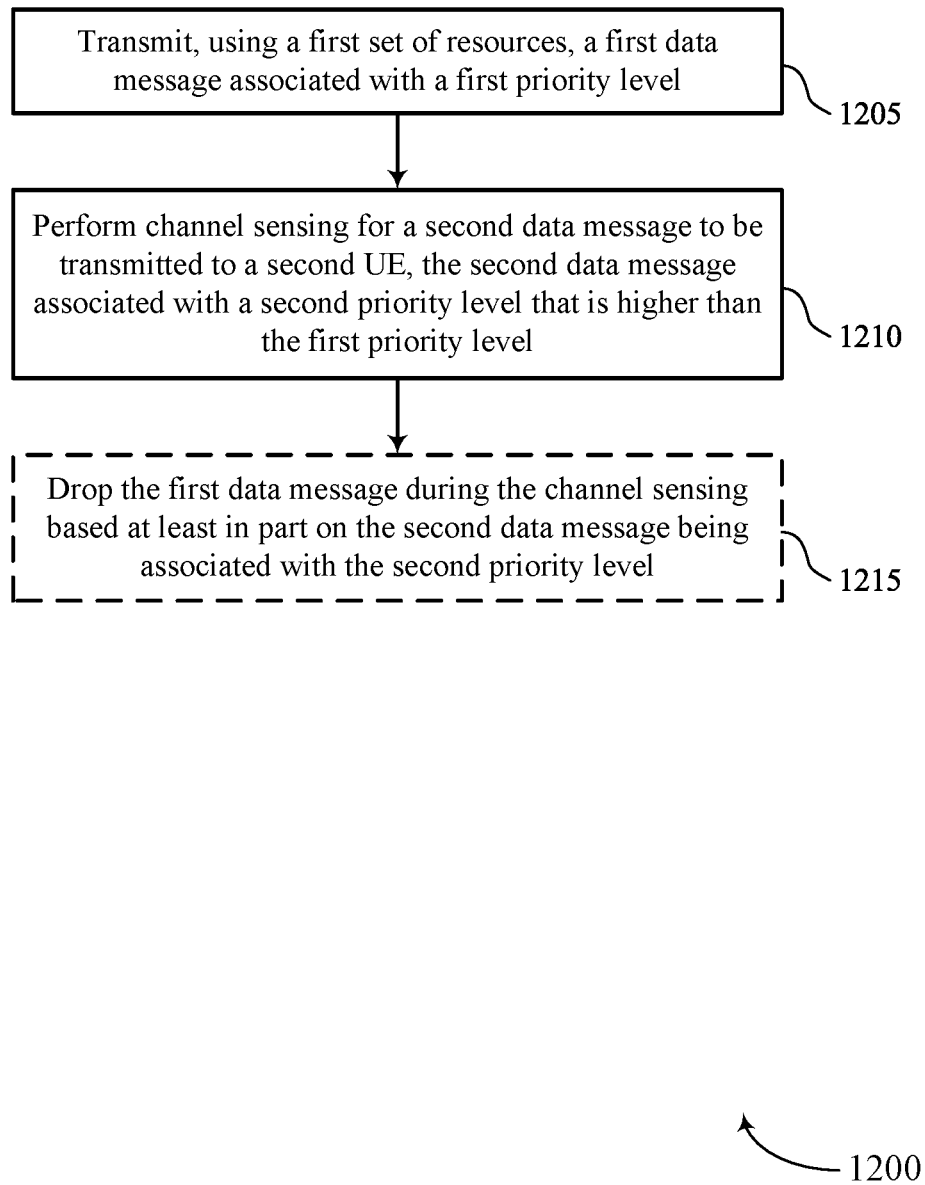

FIG. 12 shows a flowchart illustrating a method 1200 that supports sidelink channel access timeline techniques for wireless communications systems in accordance with one or more aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1205, the method may include transmitting, using a first set of resources, a first data message associated with a first priority level. The operations of 1205 may be performed in accordance with examples as disclosed herein. In some examples, aspects of the operations of 1205 may be performed by a first message component 940 as described with reference to FIG. 9.

At 1210, the method may include performing channel sensing for a second data message to be transmitted to a second UE, the second data message associated with a second priority level that is higher than the first priority level. The operations of 1210 may be performed in accordance with examples as disclosed herein. In some examples, aspects of the operations of 1210 may be performed by a channel sensing component 945 as described with reference to FIG. 9.

In some examples, at 1215 the method may include dropping the first data message during the channel sensing based on the second data message being associated with the second priority level. The operations of 1215 may be performed in accordance with examples as disclosed herein. In some examples, aspects of the operations of 1215 may be performed by a dropping component 950 as described with reference to FIG. 9.

Figure 13:
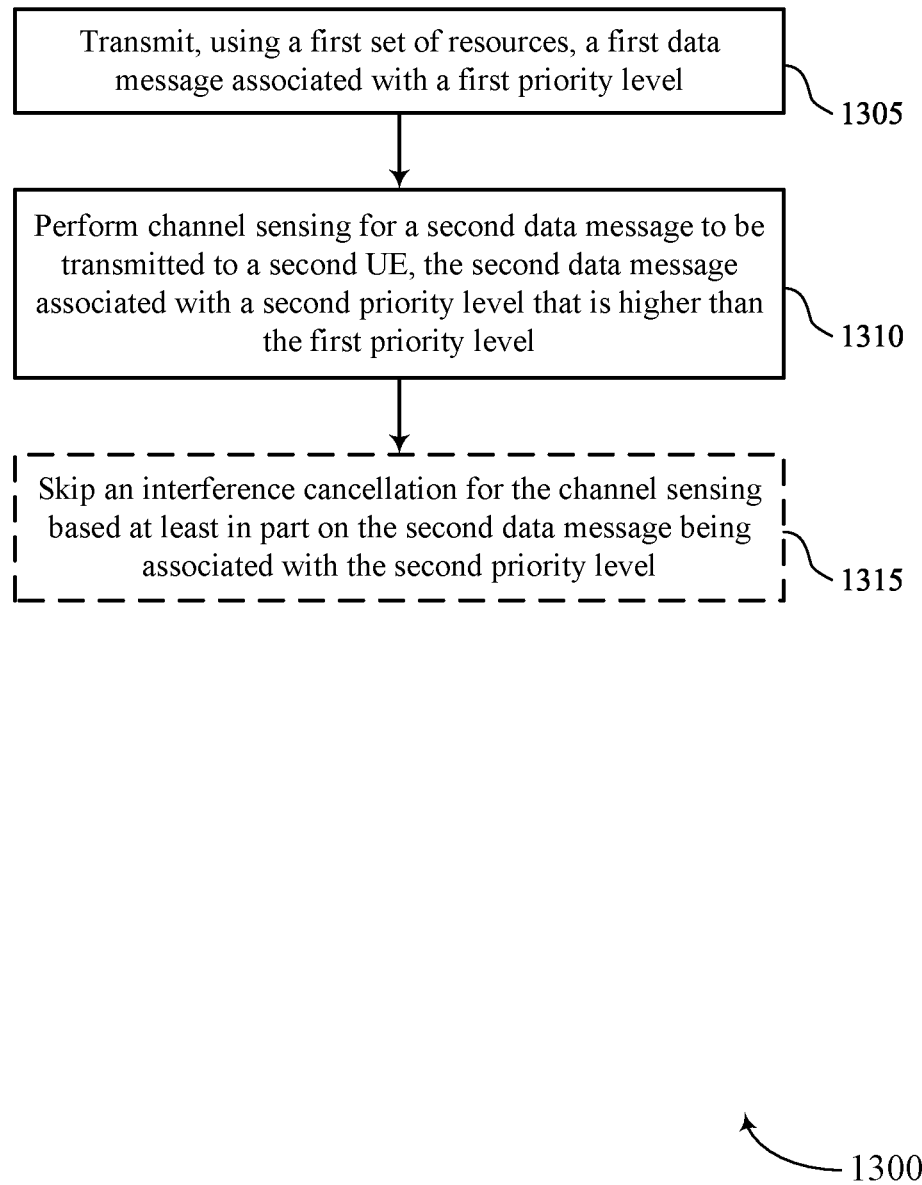

FIG. 13 shows a flowchart illustrating a method 1300 that supports sidelink channel access timeline techniques for wireless communications systems in accordance with one or more aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1305, the method may include transmitting, using a first set of resources, a first data message associated with a first priority level. The operations of 1305 may be performed in accordance with examples as disclosed herein. In some examples, aspects of the operations of 1305 may be performed by a first message component 940 as described with reference to FIG. 9.

At 1310, the method may include performing channel sensing for a second data message to be transmitted to a second UE, the second data message associated with a second priority level that is higher than the first priority level. The operations of 1310 may be performed in accordance with examples as disclosed herein. In some examples, aspects of the operations of 1310 may be performed by a channel sensing component 945 as described with reference to FIG. 9.

In some examples, at 1315 the method may include skipping an interference cancellation for the channel sensing based on the second data message being associated with the second priority level. The operations of 1315 may be performed in accordance with examples as disclosed herein. In some examples, aspects of the operations of 1315 may be performed by an interference component 955 as described with reference to FIG. 9.

The following provides an overview of aspects of the present disclosure:

Aspect 1: A method for wireless communications at a first UE, comprising: receiving control signaling indicating a configuration for performing channel sensing, the configuration comprising one or more parameters corresponding to a processing time associated with the channel sensing; adjusting the processing time associated with the channel sensing based at least in part on the one or more parameters and a full duplex capability of the first UE; and transmitting, to a second UE using a first set of resources, a sidelink message based at least in part on the adjusted processing time.

Aspect 2: The method of aspect 1, wherein adjusting the processing time comprises: increasing a first duration of the processing time associated with a half duplex capability to a second duration for the processing time associated with the full duplex capability of the first UE, wherein the one or more parameters indicate the second duration.

Aspect 3: The method of aspect 2, further comprising: adjusting a beginning of a resource selection window based at least in part on increasing the first duration to the second duration.

Aspect 4: The method of any of aspects 1 through 3, wherein adjusting the processing time comprises: reducing a duration of a sensing window associated with the channel sensing based at least in part on the full duplex capability of the first UE; and increasing a first duration for the processing time associated with a half duplex capability to a second duration for the processing time associated with the full duplex capability of the first UE, wherein the one or more parameters indicate the second duration.

Aspect 5: The method of any of aspects 1 through 4, wherein the received control signaling comprises a radio resource control message, a downlink control information message, a medium access control control element message, or any combination thereof.

Aspect 6: The method of any of aspects 1 through 5, wherein the one or more parameters comprise a first parameter indicating a first duration for the processing time and a second parameter indicating a second duration for the processing time, the first duration corresponding to a first interference cancellation capability of the first UE and the second duration corresponding to a second interference cancellation capability of the first UE.

Aspect 7: The method of aspect 6, further comprising: adjusting the processing time to the first duration based at least in part on the first UE operating in a half duplex mode, the second duration based at least in part on the first UE operating in a full duplex mode, or a combination thereof.

Aspect 8: The method of any of aspects 1 through 7, further comprising: monitoring a sensing window using the full duplex capability of the first UE for a first duration; and performing an interference cancellation for the channel sensing during the adjusted processing time based at least in part on monitoring the sensing window using the full duplex capability of the first UE.

Aspect 9: The method of any of aspects 1 through 8, further comprising: performing the channel sensing using the adjusted processing time.

Aspect 10: The method of aspect 9, further comprising: selecting the first set of resources based on a result of the channel sensing, wherein transmitting the sidelink message is based at least in part on the selected first set of resources.

Aspect 11: A method for wireless communications at a first UE capable of operating in a full duplex mode, comprising: transmitting, using a first set of resources, a first data message associated with a first priority level; performing channel sensing for a second data message to be transmitted to a second UE, the second data message associated with a second priority level that is higher than the first priority level; and dropping the first data message during the channel sensing based at least in part on the second data message being associated with the second priority level.

Aspect 12: The method of aspect 11, further comprising: selecting a second set of resources based at least in part on performing the channel sensing and dropping the first data message; transmitting the second data message using the selected second set of resources.

Aspect 13: The method of any of aspects 11 through 12, further comprising: transmitting the second data message using the first set of resources based at least in part on dropping the first data message.

Aspect 14: The method of any of aspects 11 through 13, wherein the second data message comprises a low latency message.

Aspect 15: A method for wireless communications at a first UE capable of operating in a full duplex mode, comprising: transmitting, using a first set of resources, a first data message associated with a first priority level; performing channel sensing for a second data message to be transmitted to a second UE, the second data message associated with a second priority level that is higher than the first priority level; and skipping an interference cancellation for the channel sensing based at least in part on the second data message being associated with the second priority level.

Aspect 16: The method of aspect 15, further comprising: selecting a second set of resources based at least in part on performing the channel sensing and skipping the interference cancellation; transmitting the second data message using the selected second set of resources.

Aspect 17: The method of any of aspects 15 through 16, further comprising: determining a measurement of a sensing window associated with the channel sensing; and modifying the measurement using an adjustment parameter based at least in part on skipping the interference cancellation.

Aspect 18: The method of aspect 17, further comprising: receiving control signaling indicating the adjustment parameter.

Aspect 19: The method of any of aspects 17 through 18, further comprising: selecting a second set of resources based at least in part on the channel sensing and the modified measurement; and transmitting the second data message using the selected second set of resources.

Aspect 20: The method of any of aspects 15 through 19, wherein the second data message comprises a low latency message.

Aspect 21: An apparatus for wireless communications at a first UE, comprising a processor; and memory coupled to the processor, the processor and memory configured to perform a method of any of aspects 1 through 10.

Aspect 22: An apparatus for wireless communications at a first UE, comprising at least one means for performing a method of any of aspects 1 through 10.

Aspect 23: A non-transitory computer-readable medium storing code for wireless communications at a first UE, the code comprising instructions executable by a processor to perform a method of any of aspects 1 through 10.

Aspect 24: An apparatus for wireless communications at a first UE capable of operating in a full duplex mode, comprising a processor; and memory coupled with the processor, the processor and memory configured to perform a method of any of aspects 11 through 14.

Aspect 25: An apparatus for wireless communications at a first UE capable of operating in a full duplex mode, comprising at least one means for performing a method of any of aspects 11 through 14.

Aspect 26: A non-transitory computer-readable medium storing code for wireless communications at a first UE capable of operating in a full duplex mode, the code comprising instructions executable by a processor to perform a method of any of aspects 11 through 14.

Aspect 27: An apparatus for wireless communications at a first UE capable of operating in a full duplex mode, comprising a processor; and memory coupled with the processor, the processor and memory configured to perform a method of any of aspects 15 through 20.

Aspect 28: An apparatus for wireless communications at a first UE capable of operating in a full duplex mode, comprising at least one means for performing a method of any of aspects 15 through 20.

Aspect 29: A non-transitory computer-readable medium storing code for wireless communications at a first UE capable of operating in a full duplex mode, the code comprising instructions executable by a processor to perform a method of any of aspects 15 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
   receiving control signaling indicating a configuration for performing channel sensing, the configuration comprising one or more parameters corresponding to a processing time associated with the channel sensing that occurs after a sensing window associated with the channel sensing and before a resource selection trigger;
   adjusting the processing time associated with the channel sensing based at least in part on the one or more parameters and a full duplex capability of the first UE; and
   transmitting, to a second UE using a first set of resources, a sidelink message based at least in part on the adjusted processing time.

2. The method of claim 1, wherein adjusting the processing time comprises:
   increasing a first duration of the processing time associated with a half-duplex capability to a second duration for the processing time associated with the full duplex capability of the first UE, wherein the one or more parameters indicate the second duration.

3. The method of claim 2, further comprising:
   adjusting a beginning of a resource selection window based at least in part on increasing the first duration to the second duration.

4. The method of claim 1, wherein adjusting the processing time comprises:
   reducing a duration of the sensing window associated with the channel sensing based at least in part on the full duplex capability of the first UE; and
   increasing a first duration for the processing time associated with a half-duplex capability to a second duration for the processing time associated with the full duplex capability of the first UE, wherein the one or more parameters indicate the second duration.

5. The method of claim 1, wherein the received control signaling comprises a radio resource control message, a downlink control information message, a medium access control (MAC) control element (CE) message, or any combination thereof.

6. The method of claim 1, wherein the one or more parameters comprise a first parameter indicating a first duration for the processing time and a second parameter indicating a second duration for the processing time, the first duration corresponding to a first interference cancellation capability of the first UE and the second duration corresponding to a second interference cancellation capability of the first UE.

7. The method of claim 6, further comprising:
   adjusting the processing time to the first duration based at least in part on the first UE operating in a half-duplex mode, the second duration based at least in part on the first UE operating in a full duplex mode, or a combination thereof.

8. The method of claim 1, further comprising:
   monitoring the sensing window using the full duplex capability of the first UE for a first duration; and
   performing an interference cancellation for the channel sensing during the adjusted processing time based at least in part on monitoring the sensing window using the full duplex capability of the first UE.

9. The method of claim 1, further comprising:
   performing the channel sensing using the adjusted processing time.

10. The method of claim 9, further comprising:
    selecting the first set of resources based on a result of the channel sensing, wherein transmitting the sidelink message is based at least in part on the selected first set of resources.

11. An apparatus for wireless communications at a first user equipment (UE), comprising:
    one or more processors; and
    one or more memories coupled with the one or more processors, the one or more processors configured to cause the first UE to:
    receive control signaling indicating a configuration for performing channel sensing, the configuration comprising one or more parameters corresponding to a processing time associated with the channel sensing that occurs after a sensing window associated with the channel sensing and before a resource selection trigger;
    adjust the processing time associated with the channel sensing based at least in part on the one or more parameters and a full duplex capability of the first UE; and
    transmit, to a second UE using a first set of resources, a sidelink message based at least in part on the adjusted processing time.

12. The apparatus of claim 11, wherein, to adjust the processing time, the one or more processors are configured to cause the first UE to:

increase a first duration of the processing time associated with a half-duplex capability to a second duration for the processing time associated with the full duplex capability of the first UE, wherein the one or more parameters indicate the second duration.

13. The apparatus of claim 12, wherein the one or more processors are further configured to cause the first UE to:
adjust a beginning of a resource selection window based at least in part on the increased first duration.

14. The apparatus of claim 11, wherein, to adjust the processing time, the one or more processors are configured to cause the first UE to:
reduce a duration of the sensing window associated with the channel sensing based at least in part on the full duplex capability of the first UE; and
increase a first duration for the processing time associated with a half-duplex capability to a second duration for the processing time associated with the full duplex capability of the first UE, wherein the one or more parameters indicate the second duration.

15. The apparatus of claim 11, wherein the received control signaling comprises a radio resource control message, a downlink control information message, a medium access control (MAC) control element (CE) message, or any combination thereof.

16. The apparatus of claim 11, wherein the one or more parameters comprise a first parameter indicating a first duration for the processing time and a second parameter indicating a second duration for the processing time, the first duration corresponding to a first interference cancellation capability of the first UE and the second duration corresponding to a second interference cancellation capability of the first UE.

17. The apparatus of claim 16, wherein the one or more processors are further configured to cause the first UE to:
adjust the processing time to the first duration based at least in part on a half-duplex mode of the first UE, the second duration based at least in part on a full duplex mode of the first UE, or a combination thereof.

18. The apparatus of claim 11, wherein the one or more processors are further configured to cause the first UE to:
monitor the sensing window using the full duplex capability of the first UE for a first duration; and
perform an interference cancellation for the channel sensing during the adjusted processing time based at least in part on the sensing window monitored using the full duplex capability of the first UE.

19. The apparatus of claim 11, wherein the one or more processors are further configured to cause the first UE to:
perform the channel sensing using the adjusted processing time.

20. The apparatus of claim 19, wherein the one or more processors are further configured to cause the first UE to:
select the first set of resources based on a result of the channel sensing, wherein the transmitted sidelink message is based at least in part on the selected first set of resources.

21. A non-transitory computer-readable medium storing code for wireless communications at a first user equipment (UE), the code comprising instructions executable by one or more processors to cause the first UE to:
receive control signaling indicating a configuration for performing channel sensing, the configuration comprising one or more parameters corresponding to a processing time associated with the channel sensing that occurs after a sensing window associated with the channel sensing and before a resource selection trigger;
adjust the processing time associated with the channel sensing based at least in part on the one or more parameters and a full duplex capability of the first UE; and
transmit, to a second UE using a first set of resources, a sidelink message based at least in part on the adjusted processing time.

22. The non-transitory computer-readable medium of claim 21, wherein the instructions to adjust the processing time are further executable by the one or more processors to cause the first UE to:
increase a first duration of the processing time associated with a half-duplex capability to a second duration for the processing time associated with the full duplex capability of the first UE, wherein the one or more parameters indicate the second duration.

23. The non-transitory computer-readable medium of claim 22, wherein the instructions are further executable by the one or more processors to cause the first UE to:
adjust a beginning of a resource selection window based at least in part on increasing the first duration to the second duration.

24. The non-transitory computer-readable medium of claim 21, wherein the instructions to adjust the processing time are further executable by the one or more processors to cause the first UE to:
reduce a duration of the sensing window associated with the channel sensing based at least in part on the full duplex capability of the first UE; and
increase a first duration for the processing time associated with a half-duplex capability to a second duration for the processing time associated with the full duplex capability of the first UE, wherein the one or more parameters indicate the second duration.

25. The non-transitory computer-readable medium of claim 21, wherein the received control signaling comprises a radio resource control message, a downlink control information message, a medium access control (MAC) control element (CE) message, or any combination thereof.

26. The non-transitory computer-readable medium of claim 21, wherein the one or more parameters comprise a first parameter indicating a first duration for the processing time and a second parameter indicating a second duration for the processing time, the first duration corresponding to a first interference cancellation capability of the first UE and the second duration corresponding to a second interference cancellation capability of the first UE.

27. The non-transitory computer-readable medium of claim 26, wherein the instructions are further executable by the one or more processors to cause the first UE to:
adjust the processing time to the first duration based at least in part on the first UE operating in a half-duplex mode, the second duration based at least in part on the first UE operating in a full duplex mode, or a combination thereof.

28. The non-transitory computer-readable medium of claim 21, wherein the instructions are further executable by the one or more processors to cause the first UE to:
monitor the sensing window using the full duplex capability of the first UE for a first duration; and
perform an interference cancellation for the channel sensing during the adjusted processing time based at least in part on monitoring the sensing window using the full duplex capability of the first UE.

29. The non-transitory computer-readable medium of claim 21, wherein the instructions are further executable by the one or more processors to cause the first UE to:

perform the channel sensing using the adjusted processing time.

30. An apparatus for wireless communications at a first user equipment (UE), comprising:
  means for receiving control signaling indicating a configuration for performing channel sensing, the configuration comprising one or more parameters corresponding to a processing time associated with the channel sensing that occurs after a sensing window associated with the channel sensing and before a resource selection trigger;
  means for adjusting the processing time associated with the channel sensing based at least in part on the one or more parameters and a full duplex capability of the first UE; and means for transmitting, to a second UE using a first set of resources, a sidelink message based at least in part on the adjusted processing time.

* * * * *